(12) United States Patent
Sawai et al.

(10) Patent No.: US 7,850,314 B2
(45) Date of Patent: Dec. 14, 2010

(54) LIGHT-EMITTING MODULE AND IMAGE PROJECTION APPARATUS USING SAME

(75) Inventors: Yasumasa Sawai, Yamatotakada (JP); Kenji Konno, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 930 days.

(21) Appl. No.: 11/706,533

(22) Filed: Feb. 15, 2007

(65) Prior Publication Data

US 2007/0201235 A1 Aug. 30, 2007

(30) Foreign Application Priority Data

Feb. 24, 2006 (JP) ............................. 2006-047625
Mar. 15, 2006 (JP) ............................. 2006-070375

(51) Int. Cl.
*G03B 21/28* (2006.01)
(52) U.S. Cl. ..................................................... 353/98
(58) Field of Classification Search ............. 353/52–61, 353/94, 98; 362/296.01–296.09, 297–303, 362/341, 347, 350, 800; 313/493; 349/5, 349/7

See application file for complete search history.

(56) References Cited

U.S. PATENT DOCUMENTS

| | | | | |
|---|---|---|---|---|
| 6,443,575 B1 * | 9/2002 | Miyamoto et al. | ............ | 353/58 |
| 6,578,998 B2 * | 6/2003 | Zhang | ........................ | 362/555 |
| 7,070,301 B2 * | 7/2006 | Magarill | ..................... | 362/241 |
| 7,192,147 B2 * | 3/2007 | Sakata et al. | .................. | 362/19 |
| 7,222,968 B2 * | 5/2007 | Magarill et al. | ............... | 353/31 |
| 7,607,801 B2 * | 10/2009 | Suehiro et al. | .............. | 362/294 |

FOREIGN PATENT DOCUMENTS

| | | |
|---|---|---|
| JP | 1-143366 A | 6/1989 |
| JP | 5-38927 A | 5/1993 |
| JP | 11-295690 A | 10/1999 |
| JP | 2002-9347 A | 1/2002 |
| JP | 2005-189824 A | 7/2005 |
| JP | 2005-322701 A | 11/2005 |

* cited by examiner

*Primary Examiner*—Georgia Y Epps
*Assistant Examiner*—Danell L Owens
(74) *Attorney, Agent, or Firm*—Sidley Austin LLP

(57) ABSTRACT

A light-emitting module has: a single reflector having a plurality of concave reflection surfaces; and light emitters in a same number as a number of the concave reflection surfaces. Each of the concave reflection surface has an outer shape partially notched at a boundary thereof with the adjacent concave reflection surface. Each of the light emitters emits light toward the concave reflection surface.

10 Claims, 16 Drawing Sheets

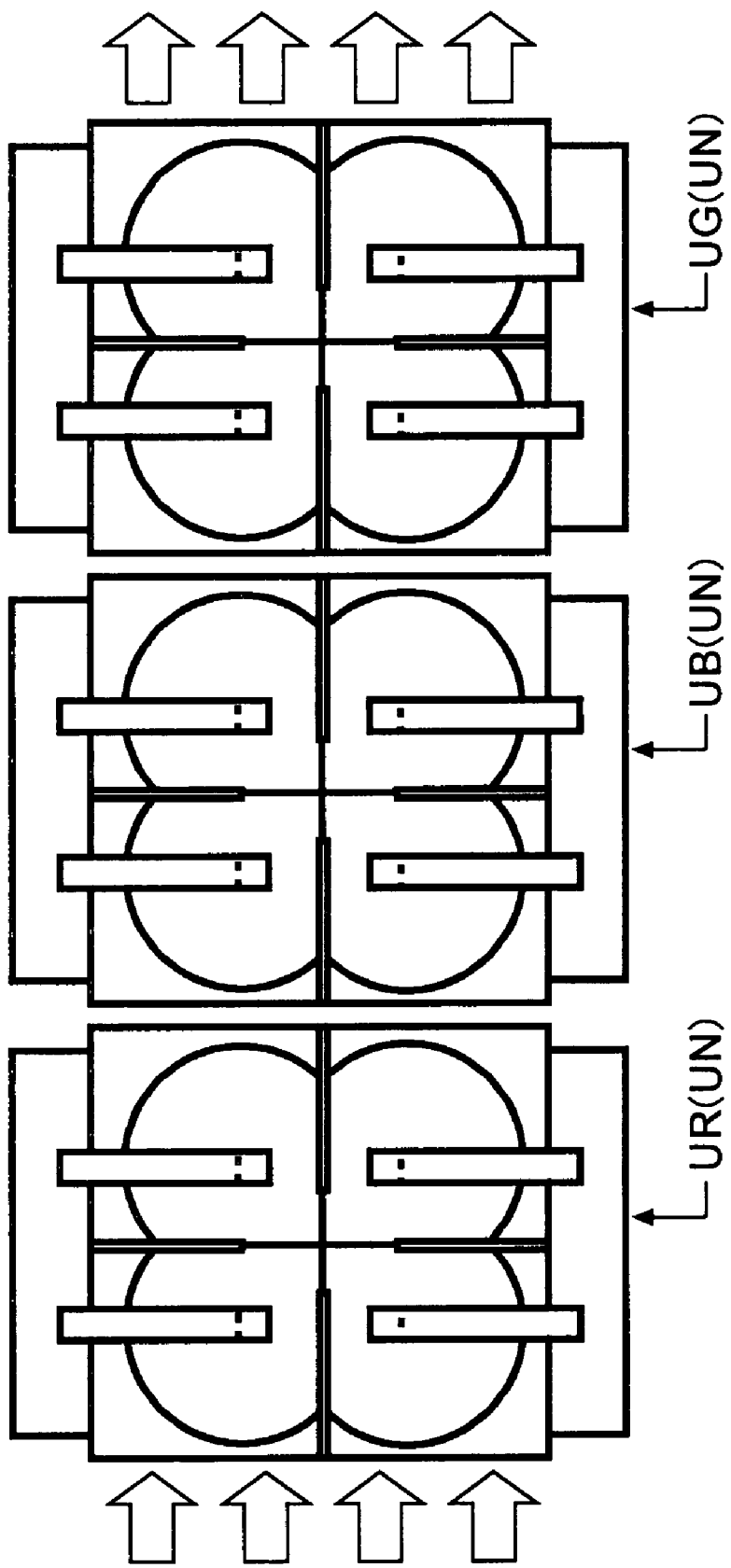

LIGHT-EMITTING MODULE AND IMAGE PROJECTION APPARATUS USING SAME

This application is based on Japanese Patent Application No. 2006-47625 filed on Feb. 24, 2006 and Japanese Patent Application No. 2006-70375 filed on Mar. 15, 2006, the contents of which are hereby incorporated by reference.

BACKGROUND OF THE INVENTION

1. Field of the Invention

The present invention relates to a light-emitting module and an image projection apparatus using such a light-emitting module, for example, relates to a reflection type light-emitting module having a light emitting diode (LED) chip as a light emitter and an image projection apparatus using such a light-emitting module.

2. Description of Related Art

Patent document 1 suggests a reflection type light-emitting module composed of a combination of a reflector having a concave reflection surface and a light emitting diode (LED) chip. The light-emitting module is structured as a so-called reflection type LED which emits only light reflected by the reflector. With this structure, an electrode lead connected to the LED chip also functions as a heat sink, thus permitting a certain degree of improvement in the efficiency to. Patent document 2 suggests a reflection type light-emitting module composed of a plurality of LED chips arranged in one reflector having a concave reflection surface. This light-emitting module is configured such that distribution of light of the plurality of LED chips is performed on one reflection surface, thus permitting higher intensity to be achieved.

Patent document 3 suggests a mobile device composed of a combination of a transmission type liquid crystal element and three LEDs arranged on the back side thereof. The three LEDs correspond to three primary colors RGB, respectively, and are configured to illuminate images of the respective colors displayed by the transmission type liquid crystal element by being driven in a time shared manner. Patent document 4 suggests a light source device which, by using three LEDs corresponding to three primary colors RGB, synthesizes light of the respective colors with a dichroic prism.

If the light-emitting module described in patent document 1 is assumed to be used as, for example, an illumination light source device for a projector, a plurality of light-emitting modules need of the same type need to be arranged in parallel for the purpose of achieving higher intensity. The parallel arrangement of a plurality of light-emitting modules results in overall upsizing and also inefficient illumination for a display panel. In the light-emitting module described in patent document 2, a plurality of LED chips are used for one reflection surface, thus resulting in a large substantial size of a light source. As a result, the angle of light distribution is very large, thus leading to failure to achieve a light-emitting module with excellent light distribution characteristics and high efficiency.

On the other hand, in the mobile device described in patent document 3, an illumination optical system is not used which condenses illumination light from the LEDs and directs it to the transmission type liquid crystal element, thus resulting in failure to efficiently illuminate the transmission type liquid crystal element and thus failure to achieve a bright projection image. The light source device described in patent document 4 has a dichroic prism for the purpose of achieving full color, which is disadvantageous in terms of cost and size. That is, due to the configuration such that color synthesis is performed by the dichroic prism, not only the dichroic prism leads to cost increase, but also space for arranging the dichroic prism needs to be ensured. Therefore, the light source device is not suitable for an image projection apparatus which needs to be small in size and low in cost.

[Patent Document 1] JP-A-2005-322701
[Patent Document 2] JP-A-2002-9347
[Patent Document 3] JP-A-H11-295690
[Patent Document 4] JP-A-2005-189824

SUMMARY OF THE INVENTION

It is an object of the present invention to provide a high-intensity, high-efficiency, and small-size light-emitting module and a small-size, low-cost image projection apparatus using such a light-emitting module.

According to one aspect of the invention, a light-emitting module includes: a single reflector having a plurality of concave reflection surfaces each having an outer shape partially notched at a boundary thereof with the adjacent concave reflection surface; and light emitters in a same number as a number of the concave reflection surfaces, each of the light emitters emitting light toward the concave reflection surface.

According to another aspect of the invention, a light-emitting module includes: a single reflector having a plurality of concave reflection surfaces arranged in rotational symmetry to a center axis of the reflector, wherein, when the reflector is viewed along the center axis thereof from front, a boundary between the adjacent concave reflection surfaces forms a straight line directed toward the center axis of the reflector; and light emitters in a same number as a number of the concave reflection surfaces, each of the light emitters emitting light toward the concave reflection surface.

According to still another aspect of the invention, an image projection apparatus includes: a light-emitting module which generates illumination light; a spatial modulation element of a transmission type which forms an image by spatially modulating illumination light; and a projection optical system which projects an image formed by the spatial modulation element. The light-emitting module includes: a single reflector having a plurality of concave reflection surfaces each arranged in rotational symmetry to a center axis of the reflector, wherein, when the reflector is viewed along the center axis thereof from front, a boundary between the adjacent concave reflection surfaces forms a straight line directed toward the center axis of the reflector; and light-emitting diodes in a same number as a number of the concave reflection surfaces. Each light-emitting diode includes: a light-emitting diode chip which is arranged at or near a focal position of each of the concave reflection surfaces and which radiates light toward the concave reflection surface; and an electrode lead, for fixing the light-emitting diode chip, which electrode lead is arranged opposite to the concave reflection surface with respect to the light-emitting diode chip.

According to still another aspect of the invention, an image projection apparatus includes: a spatial modulation element of a transmission type which forms an image by spatially modulating illumination light; a light-emitting module for illuminating the spatial modulation element; and a projection optical system which projects an image formed by the spatial modulation element. The light-emitting module includes: a light-emitting diode; and a reflector having a concave reflection surface which reflect a beam of light from the light-emitting diode toward the spatial modulation element. The light-emitting diode has: a light-emitting diode chip arranged at or near a focal position of the concave reflection surface; and an electrode lead, for fixing the light-emitting diode chip, which electrode lead is arranged opposite to the concave reflection surface with respect to the light-emitting diode chip.

BRIEF DESCRIPTION OF THE DRAWINGS

FIG. 11 is an elevation view showing arrangement condition of the light source units (type 1) of RGB;

DETAILED DESCRIPTION OF PREFERRED EMBODIMENTS

Hereinafter, embodiments and the like of a light-emitting module and an image projection apparatus using such a light-emitting module according to the present invention will be described with reference to the accompanying drawings. The same portions or corresponding portions among the embodiments and the like are provided with the same numerals and thus omitted from the description as appropriate.

Figure 1A:
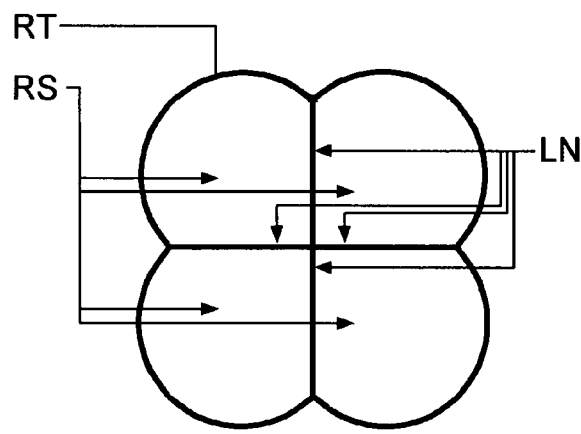
FIGS. 1A and 1B are elevation views for explaining effect provided by structure of adjacent concave reflection surfaces in one detailed example of a reflector according to the present invention.
Figures 2A, 2B:
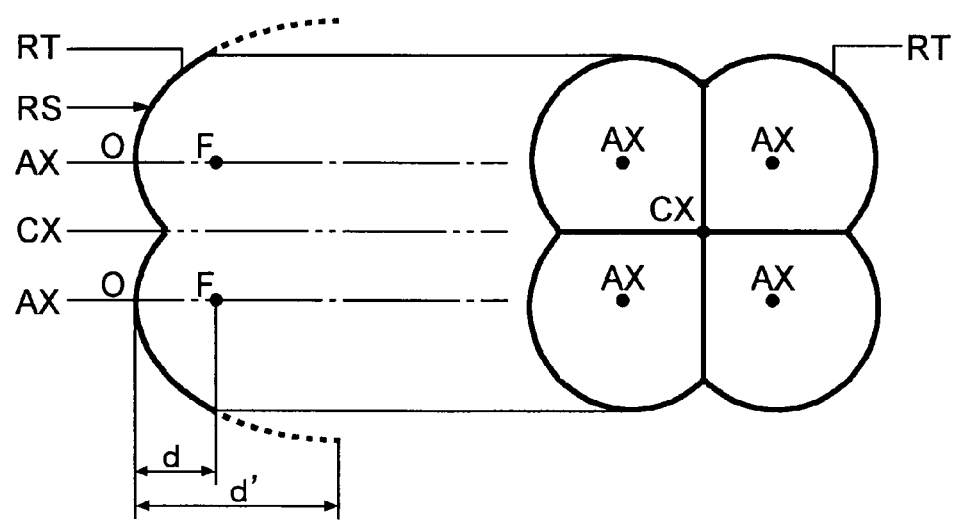
FIGS. 2A and 2B are diagrams for explaining effect of thinning the concave reflection surfaces in one detailed example of the reflector.
Figure 3A:
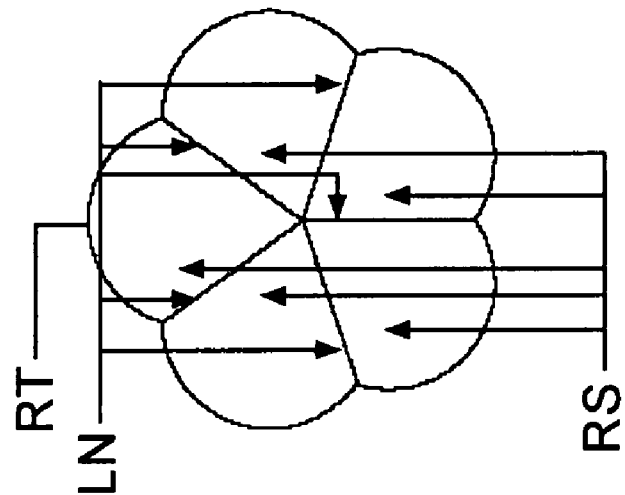
FIGS. 3A, 3B, and 3C are elevation views showing detailed examples of the reflector having a plurality of concave reflection surfaces.
Figure 3B:
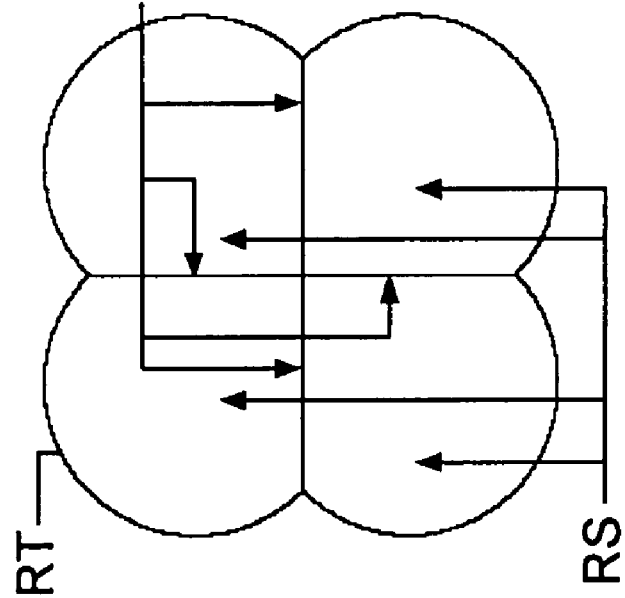
Figure 3C:
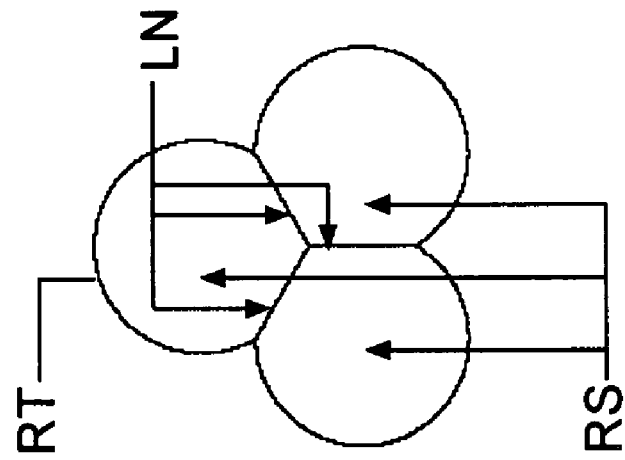

FIG. 1A shows one detailed example of a reflector RT having four concave reflection surfaces RS, and FIGS. 2A and 2B show the shapes, positional relationship, and the like of the concave reflection surfaces RS in the reflector RT. FIG. 1A shows front side outer appearance of the concave reflection surfaces RS, FIG. 2A shows cross-sectional shapes of the concave reflection surfaces RS, and FIG. 2B shows front side outer appearance of the concave reflection surfaces RS in a manner such that optical axes AX and a central axis CX correspond to those shown in FIG. 2A. The reflector RT shown in FIGS. 1A, 2B, and 2B is single-structured with four concave reflection surfaces RS. With a reflector structured to have a plurality of concave reflection surfaces as described above, arranging a light emitter (for example, LED chip) on each of the concave reflection surfaces permits achieving higher intensity of a light-emitting apparatus (corresponding to a light-emitting module MJ to be described later). A larger number of light emitters results in better intensity. Thus, the higher the intensity is required; a larger number of concave reflection surfaces are set, thereby satisfying the demand for higher intensity. FIGS. 3A to 3C show detailed examples of three types of reflectors RT with different numbers of concave reflection surfaces RS. FIG. 3A shows the reflector RT having three concave reflection surfaces RS, FIG. 3B shows the reflector RT having four concave reflection surfaces RS (the same configuration as that of the reflector RT shown in FIGS. 1A, 2A, and 2B), and FIG. 3C shows the reflector RT having five concave reflection surfaces RS.

Due to the single structure of the reflector having a plurality of concave reflection surfaces as described above, overall downsizing can be achieved and assembly operations and the like are no longer required. Arranging a plurality of reflectors having one concave reflection surface in a row results in error attributable to this parallel arrangement, requires operation of assembling them in a row, and forms clearance between the reflectors. This leads to a problem of upsizing of the entire light-emitting apparatus and further leads to a problem of upsizing of a system (illumination optical system or the like) due to upsizing of outgoing light. Integrating the plurality of concave reflection surfaces excludes such problems. Therefore, it is preferable that the reflector having a plurality of concave reflection surfaces be single-structured.

Typically, light emitters having the same emission area provides the same brightness. For example, to quadruplicate the light-emitting area on one concave reflection surface, four light emitters and a concave reflection surface (double sized) are required. If four light emitters are used on one concave reflection surface, providing the same optical sensitivity results in an increase in the angle of divergence, which requires doubling the focal length. A larger focal length results in a deeper concave reflection surface, thus resulting in a thicker light-emitting apparatus in the optical axis direction. In addition, the proximity between the light-emitters raises a problem of difficult cooling. The same applies to a case where light emitters of three primary colors RBG are used on one concave reflection surface, more specifically; the angle of divergence differs among the different colors, thus causing the same problem as described above. On the contrary, with structure having a plurality of concave reflection surfaces as is the case with the reflector RT shown in FIGS. 1A, 2A, and 2B, arranging on each of the concave reflection surfaces a light emitting element permits a larger light-emitting area without increasing the angle of divergence and the focal length, that is, permits achieving higher intensity without providing a thicker light-emitting apparatus.

The reflector RT shown in FIGS. 1A, 2A, and 2B is configured such that each of the concave reflection surfaces RS is rotationally symmetric with respect to a center axis CX of the reflector RT. Such configuration with each of the concave reflection surfaces arranged in rotational symmetry with respect to the center axis of the reflector, when applied to a general rotationally-symmetrical optical system, permits preventing illumination ununiformity and the like. For example, considering its application to a projector or the like, a spatial modulation element such as a digital micromirror device, an LCD (liquid crystal display), or the like, an illumination optical system, a projection optical system, and the like typically have a rotationally-symmetrical axis. In application of such optical configuration, to prevent light from the light-emitting apparatus from becoming ununiform, it is preferable that each of the concave reflection surfaces be rotationally-symmetrical with respect to the center axis of the reflector.

The reflector RT shown in shown in FIGS. 1A, 2A, and 2B are characterized in the configuration of adjacent concave reflection surfaces RS. For example, each concave reflection surface RS is characterized by having an outer shape partially notched at a boundary thereof with the adjacent concave reflection surface RS. This notched portion forms a linear boundary shown in FIGS. 1A and 2B. Therefore, from this viewpoint, the reflector RT is characterized in that, when the reflector RT is viewed along the center axis CX thereof from the front, the boundaries between the adjacent concave reflection surfaces RS form straight lines LN directed to the center axis CX of the reflector RT. That is, the reflector RT is characterized in that, when the reflector RT is viewed from the front, the boundaries between the adjacent concave reflection surfaces RS form the straight lines LN extending radially from the center axis CX of the reflector RT as a center. Setting the configuration of the adjacent concave reflection surfaces RS as described above largely contributes to, as described below, downsizing of the reflector RT without impairing achievement of higher intensity and higher efficiency of a light-emitting apparatus.

Figure 1B:
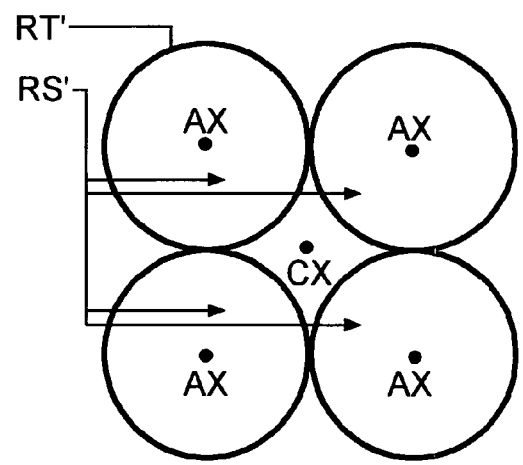

For comparison with the reflectors RT shown in FIG. 1A, FIG. 1B shows the front side outer appearance of a reflector RT' having four concave reflection surfaces RS'. The four concave reflection surfaces RS', as is the case with the detailed example shown in FIG. 1A, are so arranged as to be rotationally-symmetrical with respect to a center axis CX of the reflector RT, but the four concave reflection surfaces RS' having a circular-shaped aperture of the same size are so arranged as to make contact with the respective adjacent concave reflection surfaces RS' at one point. This arrangement results in low light utilization efficiency due to a large clearance between the concave reflection surfaces RS'. Placing each concave reflection surface RS' in the contact condition shown in FIG. 1B closer to the center axis CX so as to reduce a distance between the optical axes AX partially notches the outer shape of each concave reflection surface RS' from its contact point with the adjacent concave reflection surface RS' while maintaining the rotational symmetry with respect to the center axis CX. This notched portion serves as a boundary, and the portion where the two concave reflection surfaces RS' are superimposed one on another forms a concave curve.

Viewing, along the center axis CX, the concave curve formed by the superimposed two concave reflection surfaces RS' described above, the projected shape (that is, shape of a curve projected on the plane perpendicular to the center axis CX) is a straight line. This straight line becomes longer as each concave reflection surface RS' approaches the center axis CX while a clearance between the concave reflection surfaces RS' and the overall size of the reflector RT' decrease. Then, when all the straight lines reach the position of the center axis CX, condition is obtained in which no clearance is present between the concave reflection surfaces RS as shown in FIG. 1A, and the boundaries between the adjacent concave reflection surface RS become straight lines LN extending radially from the center axis CX of the reflector RT. The distance between the optical axes AX when the condition without no clearance is reached (that is, the interval between rotation centers of the adjacent concave reflection surfaces RS) is of course shorter than the aperture diameter (that is, outer diameter) of the concave reflection surface RS, and the distance between the optical axes AX can be further reduced when necessary. This setting may be appropriately determined in accordance with required condition (overall reflector size, size of the concave reflection surface, the number of concave reflection surfaces, and the like). In a case where a light-emitting apparatus for a general projector is assumed, considering balance between the conditions, it is preferable that the distance between the optical axes AX be shorter than the aperture radius (that is, outer radius) of each concave reflection surface.

As described above, with the configuration such that the outer shape of each concave reflection surface at a boundary with its adjacent concave reflection surface is partially notched or the configuration such that, when the reflector is viewed along the center thereof from the front, the boundary between the adjacent concave reflection surfaces forms a straight line directed to the center of the reflector, the concave reflection surfaces are packed closely together, and the outer shape of the reflector can be formed small to thereby achieve downsizing of the entire reflector without impairing achievement of higher intensity and higher efficiency of the light-emitting apparatus. Partially notching part of the outer shape of the concave reflection surface forms this notched part into a shape concavely curved forward; therefore, those with a boundary between the concave reflection surfaces formed into a shape concavely curved forward are to be considered as the one whose outer shape of the concave reflection surface is notched.

Configuration such that the concave reflection surface is a rotationally-symmetrical surface (for example, spherical surface, paraboloid, ellipsoid, rotationally-symmetrical aspheric surface such as polynomial aspheric surface or the like) having at least one focal point, such that the thickness of the concave reflection surface in the optical axis direction is substantially equal to the distance from the surface vertex of the concave reflection surface to the focal point thereof, and such that, when the rotationally-symmetrical surface has two or more focal points (for example, in a case of ellipsoid), the thickness of the concave reflection surface in the optical axis direction is substantially equal to the distance from the surface vertex of the concave reflection surface to the focal point thereof closer to the surface vertex can be provided to downsize the reflector in the radial direction and the thickness direction and also provides favorable light use efficiency and light distribution characteristic. For example, for the reflector RT shown in FIGS. 1A, 2A, and 2B, as shown in the cross section of FIG. 2A, a thickness d of the concave reflection surface RS in the optical axis AX direction is substantially equal to a distance from a surface vertex 0 of the concave reflection surface RS to a focal point F thereof. On the contrary, as shown by broken lines in FIG. 2A, if a thickness d' of the concave reflection surface RS in the optical axis AX direction is larger than the distance from the surface vertex O of the concave reflection surface RS to the focal point F, it is obvious at first sight that the reflector RT is large in the radial direction (vertical direction with respect to the center axis CX of the reflector RT) and the thickness direction (parallel direction with respect to the center axis CX of the reflector RT). Here, the focal point does not strictly mean a focal point only but the position where light radiated from a certain object point is condensed by the concave reflection surface.

Moreover, in a case where a concave reflection surface formed of a rotationally-symmetrical surface is used, a light emitter (for example, LED chip) is typically arranged near a focal point, thereby permitting the light distribution characteristic to be optimized. In this condition, the light emitter is fixed to an electrode lead; thus, light from the light emitter is emitted hemispherically to the left side in FIG. 2A (that is, concave reflection surface RS side). Therefore, even if the thickness d of the concave reflection surface RS in the optical axis AX direction is so increased as to be larger than the distance from the surface vertex 0 of the concave reflection surface RS to the focal point F, no light reaches this thickened portion (portion with broken lines), thus resulting in an unnecessarily large reflector RT. Considering arranging the light emitter near the focal point in order to provide favorable light distribution characteristic, an attempt to achieve a minimum required size of the concave reflection surface while providing favorable light use efficiency, it is preferable that the thickness of the concave reflection surface in the optical axis direction be substantially equal to the distance from the surface vertex of the concave reflection surface to the focal point thereof (focal point closer to the surface vertex if there are more than one), and this permits achieving a light-emitting apparatus which provides favorable light distribution characteristic and which has a smallest-size reflector with favorable light use efficiency.

Figure 4:
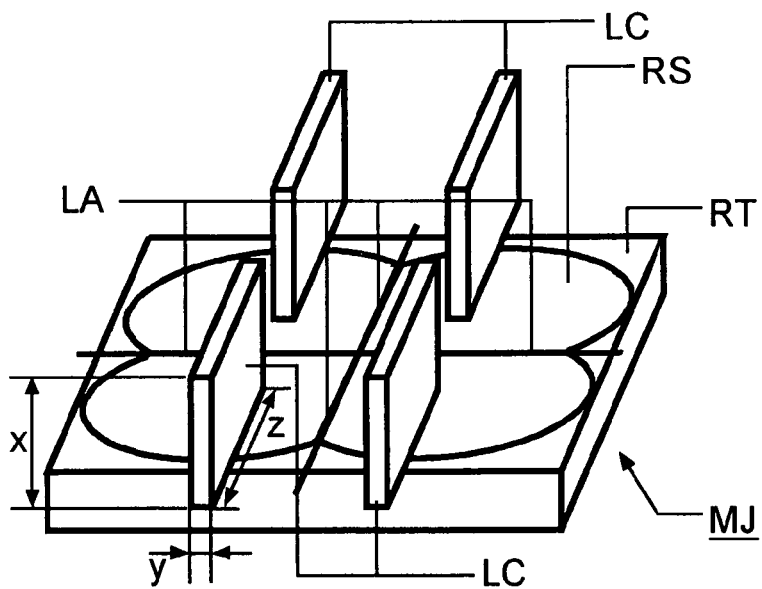
FIG. 4 is a perspective view showing outer appearance of a light-emitting module according to one embodiment of the invention.
Figure 5:
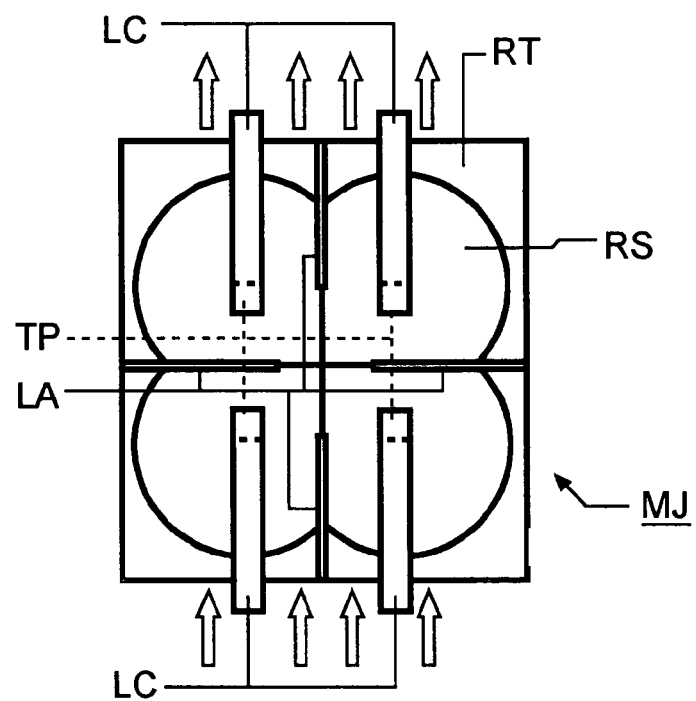
FIG. 5 is an elevation view showing outer appearance of the light-emitting module according to one embodiment of the invention.

FIGS. 4, and 5 are perspective views and an elevation view, respectively, showing outer appearance of a light-emitting module MJ provided with the reflector RT shown in FIGS. 1A, 2A, and 2B. This light-emitting module MJ is one example of a light-emitting apparatus having the reflector RT and the same number of LEDs as that of concave reflection surfaces RS. The LED loaded has, as components thereof, an LED chip TP, an electrode lead (anode) LA, and an electrode lead (cathode) LC. The LED used as an emitter is advantageous in its small size, low price, and lower power consumption. Moreover, the LED is also advantageous in that: unlike an electric bulb, it does not burn out and thus does not require replacement; it can be quickly activated without requiring much time to start emission as is the case with a discharge lamp; and the like. The reflector RT is formed of a mirror case having a concave reflection surface RS, which is formed by coating the concavely formed surface portion of a plastic plate with aluminum, silver, or the like. In the concave reflection surface RS, high-temperature resin such as epoxy resin, silicone resin, or the like for protecting the LED chip TP and the like is sealed.

As shown in FIGS. 4 and 5, the light-emitting module MJ is provided with the reflector RT having four concave reflection surfaces RS. The configuration that the four concave reflection surfaces are provided is effective in compactification when a plurality of light-emitting apparatuses are arranged. As described above, with the configuration that the reflector has a plurality of concave reflection surfaces, higher intensity of the light-emitting apparatus can be achieved by arranging an LED chip in each of the concave reflection surfaces. If the number of concave reflection surfaces RS is four, the outer shape thereof (that is, shape of the reflector RT as viewed from the front along the center axis CX) is close to a square, and the outer shape of the light-emitting module MJ provided with such a reflector RT is also close to a square.

Upon arranging a plurality of light-emitting modules MJ in the horizontal direction or vertical direction so that their center axes become parallel to one another, if the outer shape of the light-emitting modules MJ is close to a square, they can be arranged closely to one another so that no clearance is left between the light-emitting modules MJ. Therefore, it is possible to compactly load a plurality of light-emitting modules MJ in an apparatus such as a projector or the like.

Detailed configuration of one example of the light-emitting module MJ will be indicated below.

Outer shape of the reflector RT: 15.5 mm×15.5 mm
Diameter of the concave reflection surface RS: 10.5 mm
Thickness of the concave reflection surface RS: 2.95 mm
Radius of curvature of the concave reflection surface RS: 5.6 mm
Conic constant of the concave reflection surface RS: −0.8 (ellipsoid)
Distance between rotation centers of adjacent concave reflection surfaces RS: 4.9 mm
Size of the LED chip TP: 0.9 mm×0.9 mm×0.250 mm
Size of the electrode lead (cathode) LC: 1.0 mm×4.0 mm×7.0 mm
Size of the electrode lead (anode) LA: 0.3 mm×0.3 mm×6.0 mm
Distance from the vertex of the concave reflection surface RS to the LED chip surface: 2.675 mm
Distance from the vertex of the concave reflection surface RS to the electrode lead (cathode) LC: 2.925 mm
Distance from the vertex of the concave reflection surface RS to the electrode lead (anode) LA: 2.800 mm
Distance between centers of adjacent LED chips TP: 5.1 mm In the light-emitting modules MJ shown in FIGS. 4 and 5, the LED chip TP is arranged at or near the focal position of each concave reflection surface RS, and the electrode lead LC is arranged on the opposite side of the concave reflection surface RS with respect to the respective LED chip TP. With configuration of a so-called reflection type LED, the electrode lead (cathode) to which the LED chip is fixed and the concave reflection surface oppose each other, so that light from the LED chip is emitted to the concave reflection surface side only. Therefore, if the LED chip is arranged at or near the respective focal position of the concave reflection surface and the electrode lead is arranged on the opposite side of the concave reflection surface with respect to the respective LED chip, almost all of light from the LED chip is reflected on the concave reflection surface, thus permitting achieving high light use efficiency to. Moreover, the LED chip requires heat radiation, and since the electrode lead to which the LED chip is fixed also functions as a heat sink, the LED chip can be quickly cooled down by the electrode lead. This, therefore, can prevent an increase in the temperature of the LED chip to thereby achieve higher intensity. Typically, optical power (brightness) proportional to the amount of current can be provided until the junction temperature can be kept constant. However, when the junction temperature becomes high, additional making current turns into heat. Therefore, effective heat radiation permits increasing a current that can keep the junction temperature constant. As a result, brightness proportional to the making current can be provided, thus achieving a light-emitting module with high intensity.

Materials of the electrode leads LA and LC are preferably metal with favorable electric conductivity, for example, copper, aluminum, or the like. The metal, such as copper, aluminum, or the like has very favorable heat conductivity, i.e., 403 W/m/K and 236 W/m/K. Therefore, application of the metal with favorable electric conductivity as a material of the electrode lead (cathode) LC to which the LED chip TP is fixed can provide function of conducting electricity and also function of heat radiation which radiates heat from the LED chip TP. In addition, it is preferable that the surface of the electrode lead LC opposing the concave reflection surface RS is mirror-finished or subjected to reflective coating. Providing such surface treatment permits light reflected from the concave reflection surface RS, even when entering the surface of the electrode lead LC, to be so reflected again to be directed toward the concave reflection surface RS and also permits an improvement in the function of the electrode lead LC as a heat sink. The electrode lead (anode) LA to which the LED chip TP is not fixed is preferably so arranged as to be superimposed on the boundary (straight line LN) between the concave reflection surfaces RS. Since almost no effective reflected light can be provided from the boundary between the concave reflection surfaces RS, the arrangement of the electrode lead (anode) LA on the boundary between the concave reflection surfaces RS can minimize eclipse to thereby improve light use efficiency. Note that the anode and the cathode may be reversed; that is, the electrode lead LA may be used as a cathode and the electrode lead LC may be used as an anode.

The electrode lead (cathode) LC is formed into a plate-like shape. As shown in FIG. 4, provided that, of sizes of the electrode lead (cathode) LC in three directions orthogonal to one another, the size in parallel (thickness) direction with respect to the optical axis AX (FIGS. 2A and 2B) is x, the size in the width direction is y, and the size in a direction extending from the focal point F toward the periphery of the concave reflection surface RS is z, the size x in the optical axis AX direction is larger than the size y in the direction perpendicular to the optical axis AX. Since the electrode lead LC also plays a role in heat radiation, a larger surface area of the electrode lead LC results in larger radiation effect. However, if the electrode lead LC is large in the direction perpendicular to the optical axis AX, light reflected on the concave reflection surface RS is shielded, thus lowering the efficacy in emission from the light-emitting module MJ. Increasing the thickness of the electrode lead LC in the optical axis AX direction results in larger radiation effect due to an increase in the surface area, but can keep the light utilization efficiency favorable since there is almost no increase in the shielded area. Therefore, the shape of the electrode lead is preferably such that, of sizes on the plane perpendicular to the optical axis of the concave reflection surface, the size in the direction parallel to the optical axis of the concave reflection surface is larger than the smallest size. Such structure permits high radiating effect to be provided by the electrode lead while minimizing the amount of reflected light shielded by the electrode lead. More preferably, the ratio of the width (y) to the thickness (x) is 1:2 to 1:6, which is a condition for favorable cooling and moderate size, considering balance between the effect of heat radiation and the entire size.

In the light-emitting modules MJ shown in FIGS. 4 and 5, the electrode leads LC in contact with the LED chip TP face the same direction. Heat radiation is performed by the electrode lead LC itself, and bringing a refrigerant (for example, fluid such as air, liquid, or the like) into contact with the electrode lead LC can further improve the radiation effect. In this case, to efficiently make the refrigerant flow without stopping flow of the air or the liquid by air cooling or water cooling, it is preferable that the electrode leads LC face the same direction (that is, all the electrode leads LC are oriented in the same direction). This flow of the refrigerant is indicated by hollow arrows in FIG. 5. If the electrode leads LC do not face the same direction (for example, if the electrode leads LC are arranged radially around the center axis CX), the flow of air or liquid deteriorates and thus the cooling efficiency deteriorates, which leads to a decrease in intensity. Providing the structure such that all the electrode leads in contact with the LED chips face the same direction permits the effect of radiation to be improved to thereby achieve higher intensity by bringing the refrigerant into contact with the electrode lead without blocking the flow of the refrigerant.

If the electrode leads LC face the same direction as described above, there may arise some restriction upon arrangement of a plurality of light-emitting modules MJ. The end of the electrode lead LC is connected as a contact to a power source, and thus requires some space. That is, the light-emitting module MJ is likely to be large for the electrode lead LC in the parallel direction. Then, placing the light-emitting modules MJ adjacent to each other in this direction (for example, vertical direction in FIG. 5) results in a large adjacent distance, thus leading to upsizing of the entire system. Therefore, for the structure that a plurality of light-emitting modules are arranged with all the electrode leads facing the same direction, it is preferable that the direction in which the light-emitting modules are placed adjacently to each other and the direction of the electrode lead be perpendicular to each other (that is, the light-emitting modules are arranged in the direction perpendicular to the orientation direction of the electrode leads. Such structure permits a plurality of light-emitting modules to be closely arranged, thus achieving compactification.

Figure 6:
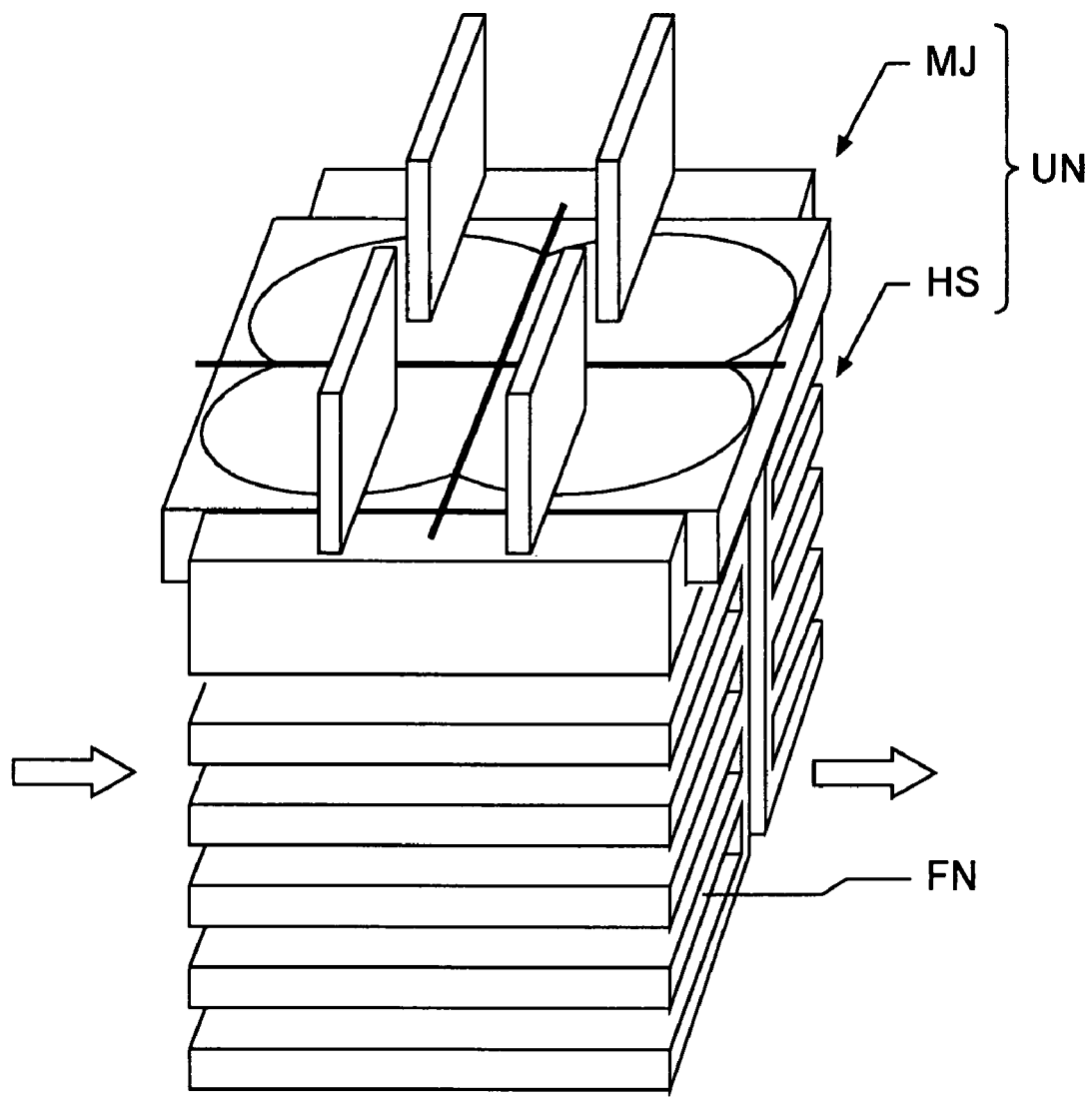
FIG. 6 is a perspective view showing outer appearance of a light source unit (type 1) according to the invention.
Figure 7A:
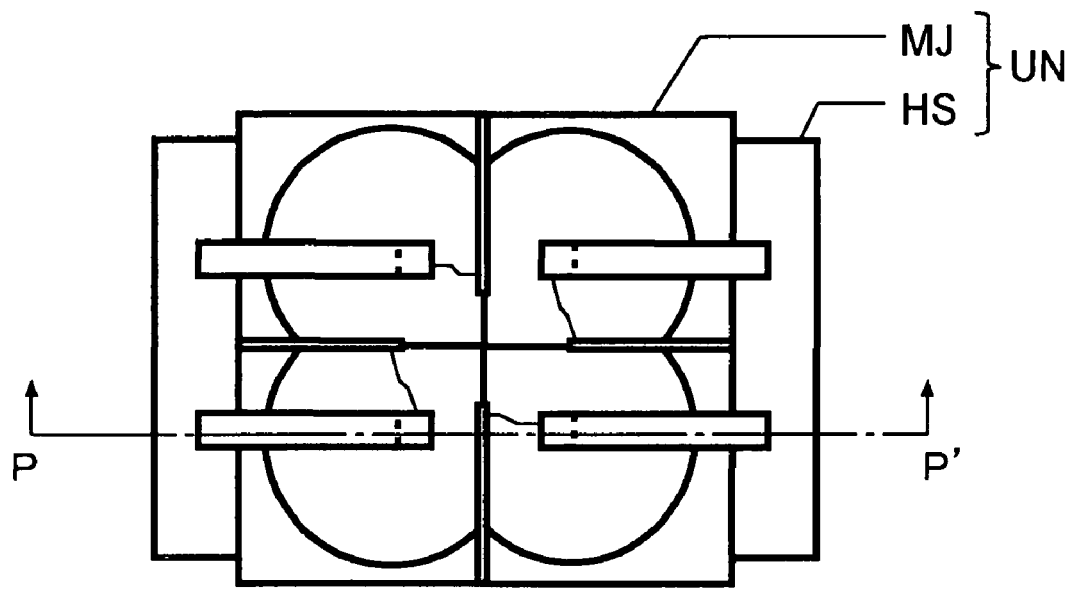
FIGS. 7A and 7B are diagrams showing front side outer appearance and sectional structure of the light source unit (type 1)
Figure 7B:
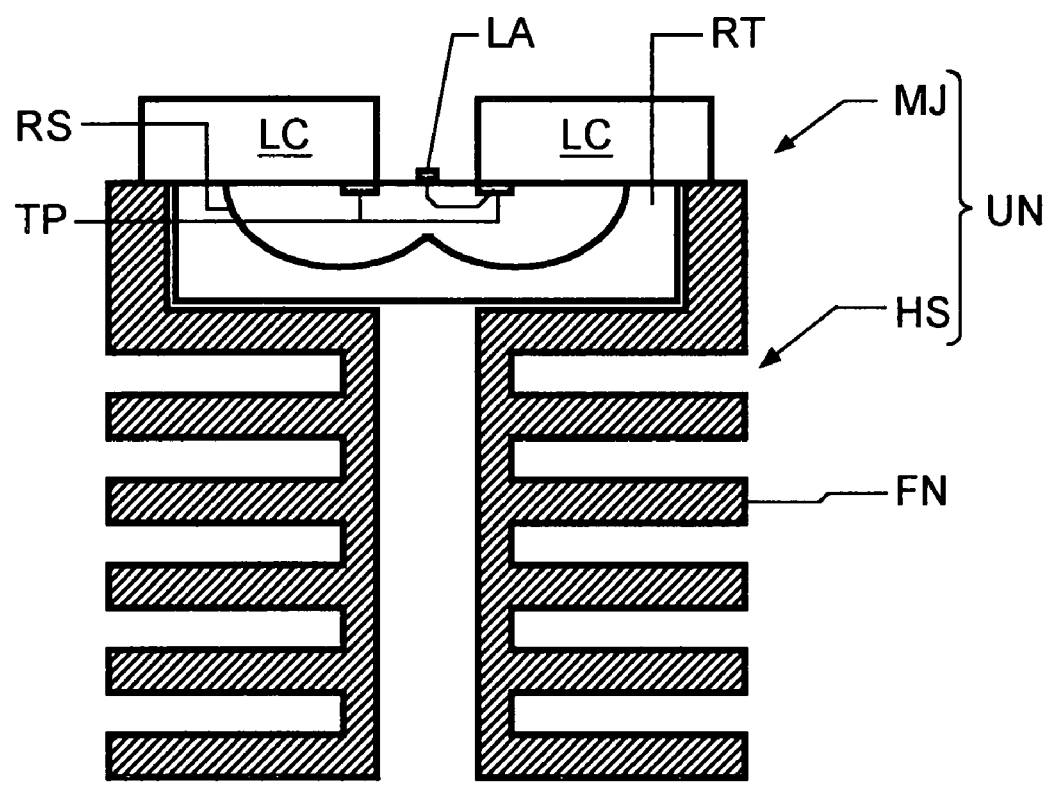
Figure 8:
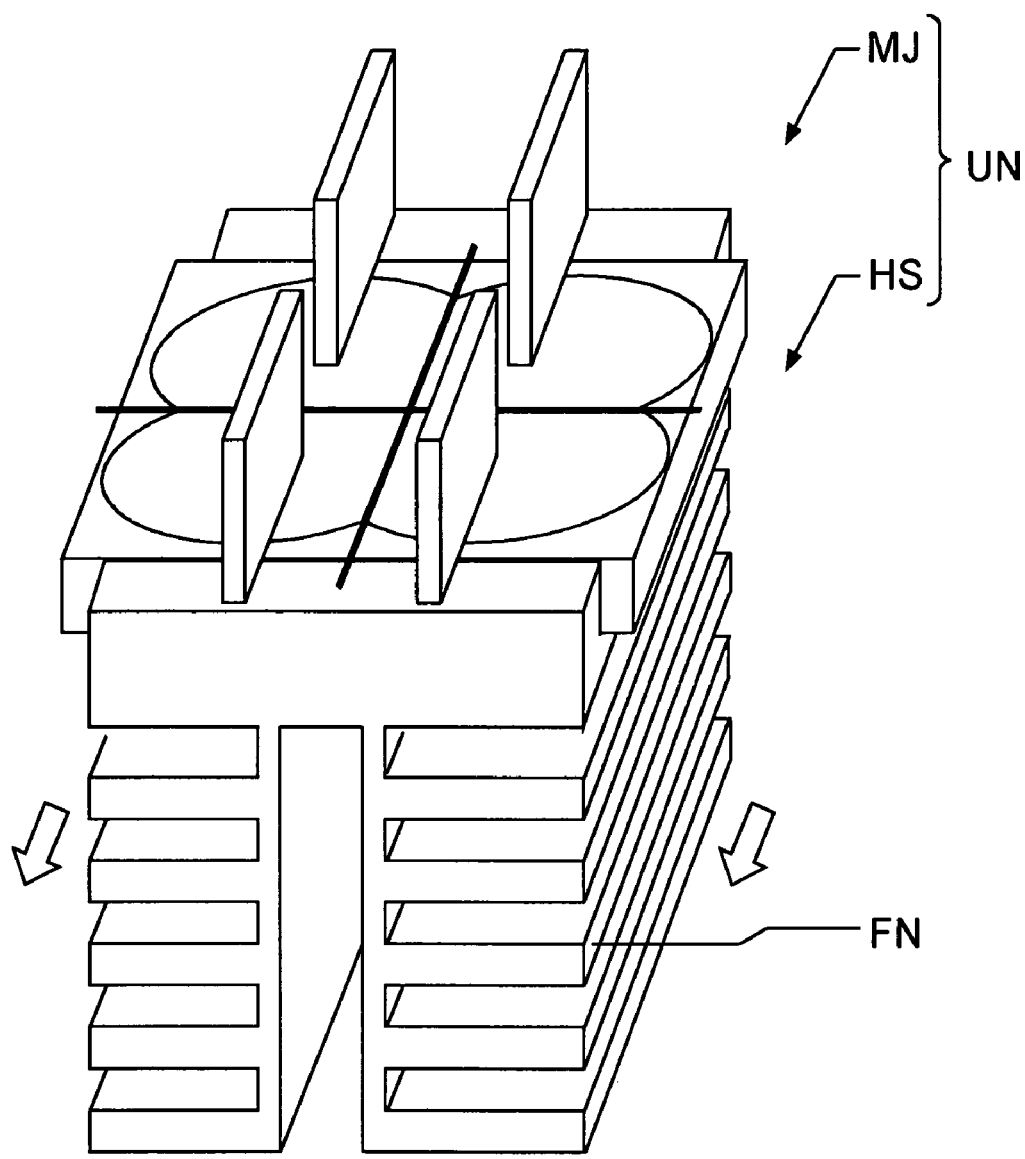
FIG. 8 is a perspective view showing outer appearance of a light source unit (type 2) according to the invention.
Figure 9A:
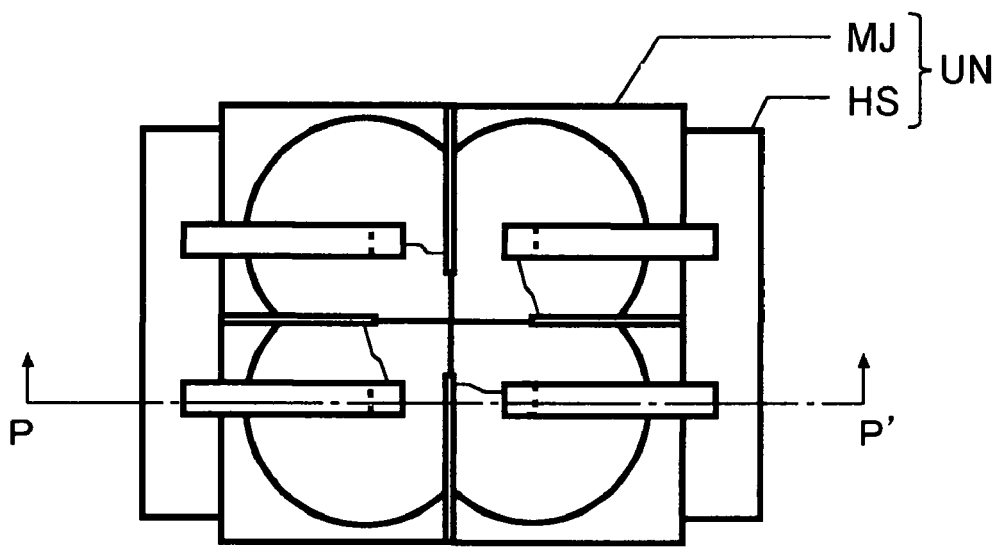
FIGS. 9A and 9B are diagrams showing front side outer appearance and sectional structure of the light source unit (type 2)
Figure 9B:
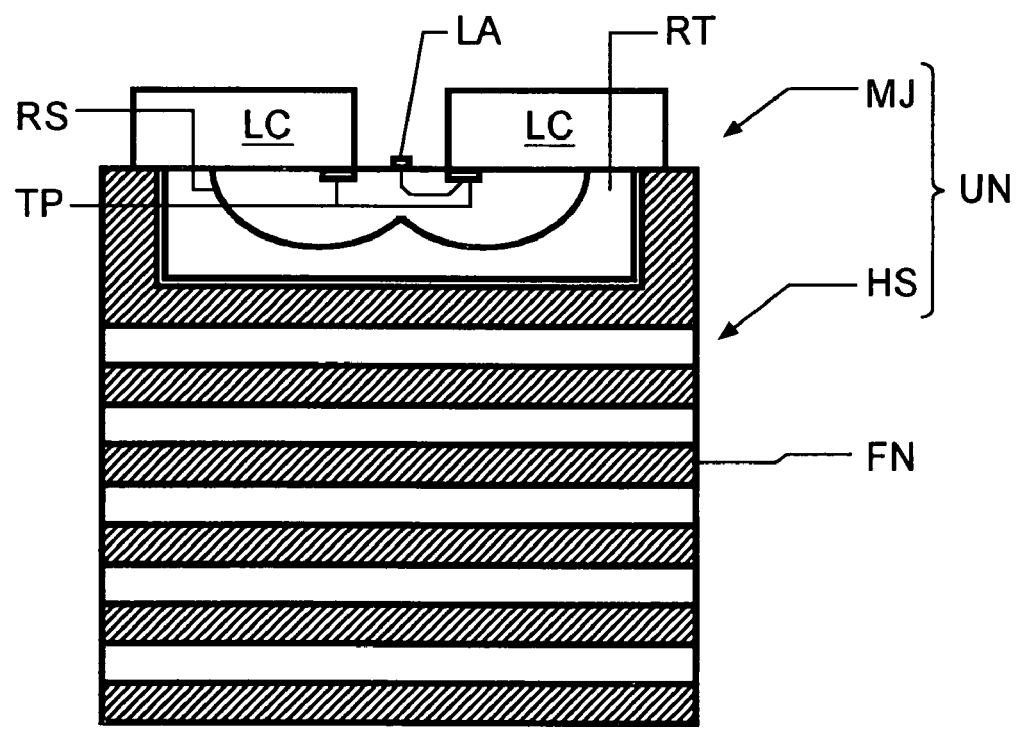

Next, a light source unit UN including the light-emitting module MJ shown in FIGS. 4 and 5 will be described. FIGS. 6, 7A, and 7B show the light source unit UN of a type 1, and FIGS. 8, 9A, and 9B show the light source unit UN of a type 2. FIGS. 6 and 8 are perspective views showing outer appearance of the light source units UN. Moreover, FIGS. 7A and 9A are elevation views showing outer appearance of the light source unit UN of the types 1 and 2, respectively, and FIGS. 7B and 9B show cross sections taken on line P-P' in FIGS. 7A and 9A, respectively. The light source units UN of the types 1 and 2 are each composed of the light-emitting module MJ and a heat sink HS, and their difference lies in the direction of a radiating fin FN included in the heat sink HS. As shown by hollow arrows in FIGS. 6 and 8, the heat sink HS is configured such that a refrigerant flows along the radiating fin FN in one direction, while its flow in the vertical direction is regulated by the inner wall surface of the heat sink HS. As shown in FIGS. 7A, 7B, 9A, and 9B, the electrode lead (anode) LA and the LED chip TP are connected together with an electric wire.

In the light source unit UN of the type 1 (FIGS. 6, 7A, 7B), the direction of the electrode lead LC and the direction of the radiating fin FN are perpendicular to each other. As described above, to arrange a plurality of light-emitting modules MJ with all the electrode leads LC facing the same direction, it is preferable in terms of compactification that the direction in which the light-emitting modules MJ are placed adjacent to each other is perpendicular to the direction of the electrode lead LC. When a plurality of light-emitting modules MJ are arranged in such a manner (see FIG. 11 to be described later), fitting the heat sink HS to the light-emitting module MJ so that the direction of the radiating fin FN becomes parallel to the direction in which the light-emitting modules MJ are placed adjacently to each other (direction perpendicular to the electrode lead LC) permits heat radiation of all the heat sinks HS with the flow of a refrigerant in one direction. For example, when three light source units UN corresponding to three primary colors RGB are arranged in line, the direction of the radiating fins FN are the same, so that the fan and the like can be cooled down at once. Therefore, upon arrangement of a plurality of light source units UN, it is preferable that the direction of the radiating fin FN be perpendicular to the electrode lead LC.

In the light source unit UN of the type 2 (FIGS. 8, 9A, and 9B), the direction of the electrode lead LC and the direction of the radiating fin FN are parallel to each other. That is, the electrode lead LC and the radiating fin FN face the same direction. Providing such structure permits heat radiation of both the electrode lead LC and the radiating fin FN with the flow of a refrigerant in one direction. Therefore, upon arrangement of one light source unit UN, it is preferable that the direction of the radiating fin FN be parallel to the direction in which the electrode lead LC is orientated.

It is preferable that the number of colors of light emitted by an LED applied for a light-emitting module as described above be at least three, including RGB. With at least three colors of light emitted by the LED including RGB, a light-emitting module can be provided which is capable of full color emission. Known as a light-emitting apparatus capable of full color emission is an optical structure which synthesizes light from three light-emitting modules corresponding to RGB with a color synthesizing mirror or a color synthesizing prism. However, this structure requires a component and space for color synthesis, which is not preferable. Moreover, also known as a light-emitting apparatus capable of full color emission is the one which has a plurality of LEDs packed together on one concave reflection surface but has difficulty in providing favorable light distribution characteristics. Considering the use of a light-emitting module (for example, light-emitting modules MJ shown in FIGS. 4 and 5) having a reflector and the same number of LEDs as that of concave reflection surfaces of the reflector for a full color projector, a small-size, high-efficiency full color light-emitting module can be provided by turning on lights of RGB or RGBY in order and making them in synchronization with an image signal of a spatial modulation element.

Figure 10A:
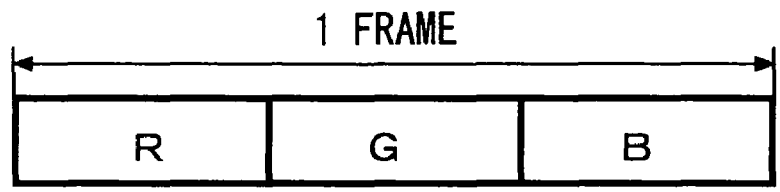
FIGS. 10A to 10D are diagrams showing concrete examples of turn-on timing of the light-emitting module.
Figure 10B:
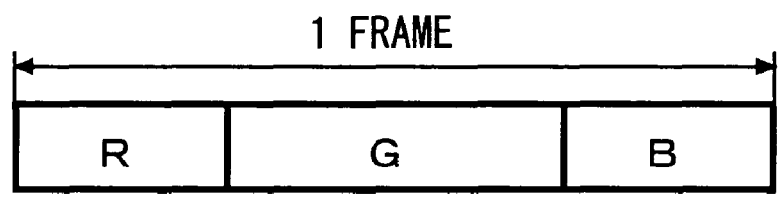
Figure 10C:
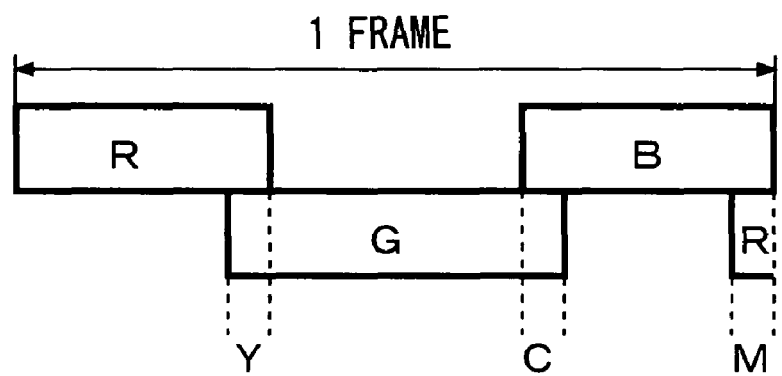
Figure 10D:
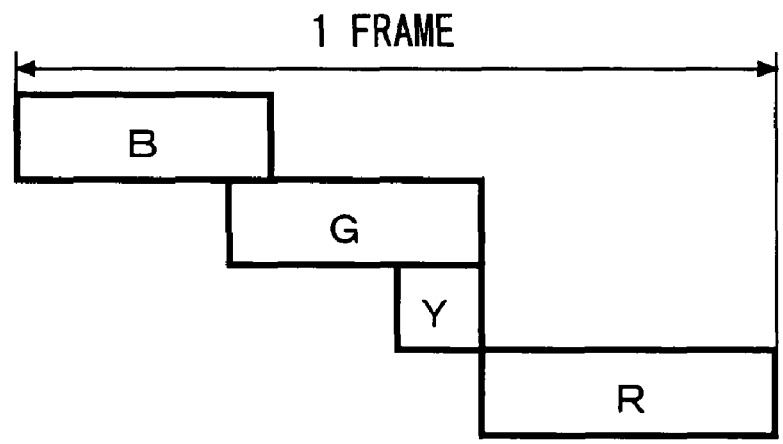

If there are at least three colors, i.e., RGB, of light emitted by the LED, for example, in the light-emitting modules MJ shown in FIGS. 4 and 5, since the reflector RT is structured to have four concave reflection surfaces RS, all the four LED chips TP may be in the same color (for example, in the three light-emitting modules MJ, four LEDs chip TP of the same color (RRRR, GGGG, and BBBB, respectively) are used), may be a combination of RGBY, or may be a combination of RGGB. Moreover, when the LEDs, such as RGB, RGBY or the like, are turned on in order for full color display, the overall intensity can be improved by setting appropriate turn-on timing. More specifically, for the turn-on timing shown in FIGS. 10A to 10D (for example, 1/30 seconds for one frame), for example, RGB may be simply divided into three as shown in FIG. 10A by using three light-emitting modules MJ of the same four colors, or the time for G may be increased as shown in FIG. 10B by using one light-emitting module MJ of a combination of RGBY or RGGB, or two or more time zones may be provided which are turned on at the same time as shown in FIG. 10C, or time at which Y and G are overlapped may be provided as shown in FIG. 10D.

Figure 12:
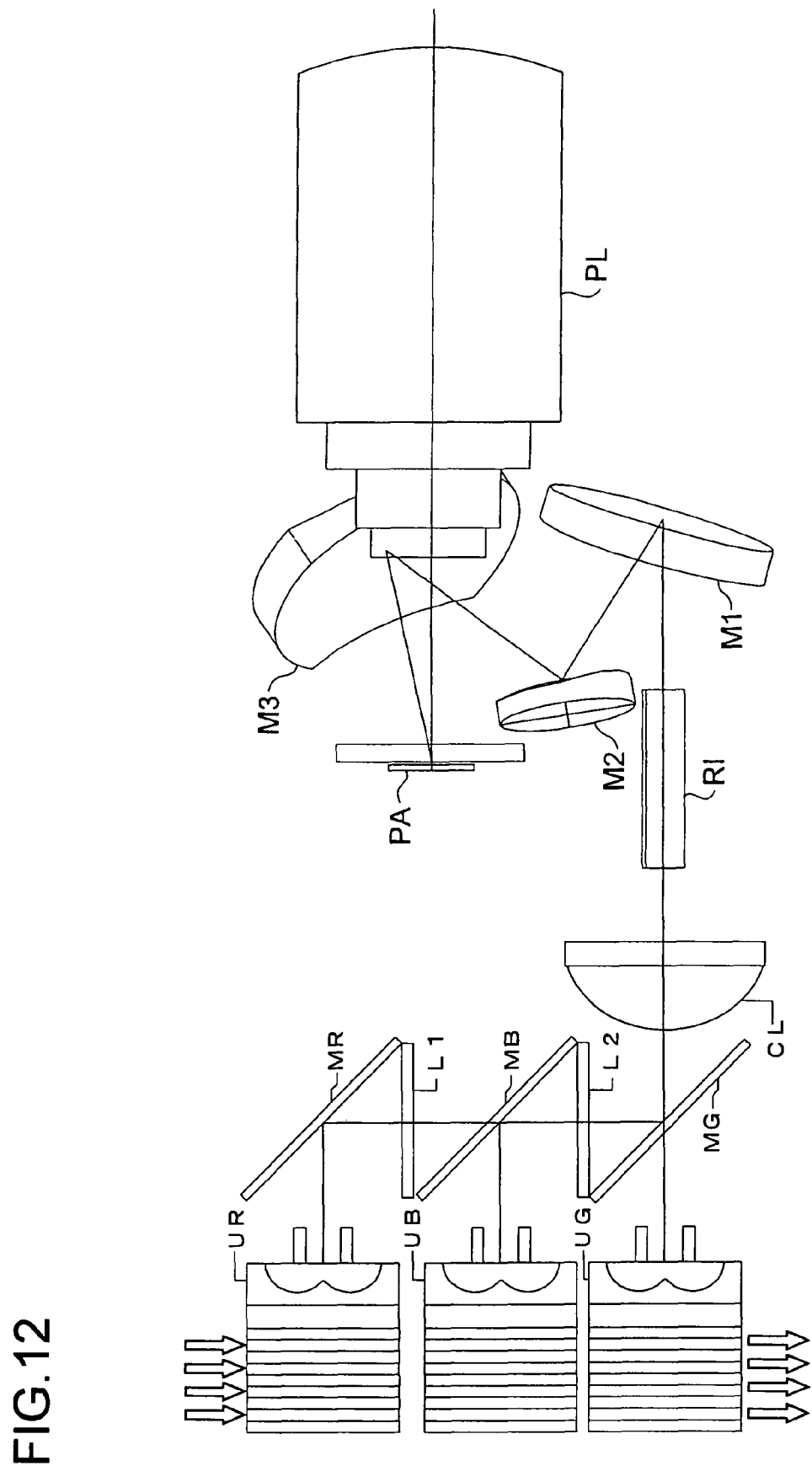
FIG. 12 is a plan view showing schematic optical configuration of a projector provided with the light source unit (type 1) of FIG. 11.

Next, a projector provided with three light-emitting modules MJ each having four LED chips TP of the same color will be described. FIG. 11 shows how three light source units UN (red light source unit UR, blue light sources unit UB, and green light source unit UG) of a type 1 are arranged, and FIG. 12 shows schematic optical configuration of a projector having these as a light source device. The red light source unit UR has four LED chips TP which all emit red light, the blue light source unit UB has four LED chips TP which all emit blue light, the green light source unit UG has four LED chips TP which all emit green light. In the arrangement of the light source units UR, UB, and UG shown in FIG. 11, the directions of the radiating fins FN are all the same, thus permitting cooling down the fans and the like at once (the flow of a refrigerant is indicated by arrows in FIGS. 11 and 12).

In FIG. 12, MR denotes a R reflection mirror, MB denotes a R transmission-B reflection dichroic mirror, MG denotes a R reflection-B reflection-G transmission dichroic mirror, L1 and L2 denote convex lenses for condensation level adjustment, CL denotes a condenser lens, RI denotes a rod integrator, M1 to M3 denote first to third mirrors, PA denotes a display panel, and PL denotes a projection optical system. Here, a digital micromirror device is assumed as the display panel PA, although not limited thereto. Thus, a different non-light emitting, reflection type (or transmission type) display element or a light valve (LCD or the like) suitable for the projection optical system PL may be used.

As shown in FIG. 12, a portion from the light source units UR, UB, and UG to the projection optical system PL corresponds to an optical engine part body, a main part forming the projector. In this optical engine part, an illumination optical system composed of the mirrors MR, MB, and MG, the convex lenses L1 and L2, the condenser lens CL, the rod integrator RI, the first to third mirrors M1 to M3 directs light from the light source units UR, UB, and UG to the display panel PA. An image displayed by the display panel PA illuminated by the illumination optical system is projected on a screen, not shown, by the projection optical system PL.

The structure of each part will be described in more detail. The light source units UR, UB, and UG each have a structure of a type 1 composed of a light-emitting module MJ and a heat sink HS (FIGS. 6, 7A, and 7B). A concave reflection surface RS of a reflector RT included in each light-emitting module MJ is formed of an ellipsoid (or paraboloid) surface, and the light source units UR, UB, and UG emit their respective corresponding weak convergent light (or parallel beam of light) with emission colors. Light exiting from the light source unit UR is reflected on the mirror MR, passes through the convex lens L1, the mirror MB, and the convex lens L2 in this order, reflected on the mirror MG, and then enters the condenser lens CL. Light exiting from the light source unit UB is reflected on the mirror MB, passes through the convex lens L2, is reflected on the mirror MG, and then enters the condenser lens CL. Light exiting from the light source unit UG is transmitted through the mirror MG, and enters the condenser lens CL. As described above, the light of R is transmitted through the convex lenses L1 and L2 and the light of B is transmitted through the convex lens L2, so that the degree of condensation of lights exiting from the light source units UR, UB, and UG on the condenser lens CL becomes equivalent to one another. Then, illumination light after color synthesis is condensed by the condenser lens CL and focused near the incidence-side end surface of the rod integrator RI.

The rod integrator RI is built as a hollow rod formed with four flat mirrors bonded together, and functions as means for making the light intensity uniform, and mixes lights entering the incidence-side end surface by reflecting it on the side face thereof (that is, inner wall surface) again and again, and makes the spatial energy distribution uniform whereby the light exits from the exit-side end surface. The shape of the incidence-side end surface and exit-side end surface of the rod integrator RI is a square similar to that of the display surface of the display panel PA. Moreover, the incidence end surface of the rod integrator RI is conjugate for the pupil of the illumination system, and the exit-side end surface of the rod integrator RI is conjugate for the display surface of the display panel PA. Under the influence of mixing described above, the intensity distribution on the exit side end surface is uniformed, and thus the display panel PA is efficiently and uniformly illuminated. The rod integrator RI is not limited to a hollow rod but may be a glass rod built with a glass body in a shape of a rectangular prism. Moreover, the number of side surfaces thereof is not limited to four if they fit with the display surface of the display panel PA. Therefore, examples of the rod integrator RI used include: a hollow cylindrical body formed of a plurality of reflection mirrors in combination, a glass body in the shape of a polygonal column, and the like.

Light exiting from the rod integrator RI enters a reflection optical system composed of first to third mirrors M1 to M3. Then, the reflection optical system forms, on the display surface of the display panel PA, an image on the exit end face of the rod integrator RI. The reflection surface of each of the first and third mirrors M1 and M3 forming the reflection optical system is a concave reflection surface, and the reflection surface of the second mirror M2 is a convex reflection surface. By the concave reflection surface of the first mirror M1, a secondary light source near the incident end face of the rod integrator RI is refocused, and a third-order light source is formed near the convex reflection surface of the second mirror M2. Light from the third-order light source is directed to the display panel PA by the concave reflection surface of the third mirror M3. Light entering the display panel PA is spatially modulated by being reflected by each micromirror in ON/OFF state (for example, with an inclination of ±12 degrees), in which condition, only light reflected on the micromirror in ON state enters the projection optical system PL, is efficiently directed to incidence pupil of the projection optical system PL by the an optical power of the concave reflection surface of the third mirror M3, and then projected on the screen by the projection optical system PL.

The projector shown in FIG. 12 is structured to have, in a reflection optical system, only two concave reflection surfaces and one convex reflection surface as optical surfaces having an optical power, included. Thus, the number of components of the illumination optical system can be reduced, compactification can be achieved, no chromatic aberration occurs and thus no color ununiformity arises thus permitting a decrease in luminance. This therefore permits use of a compact optical component advantageous in terms of mass productivity and costs while maintaining favorable optical performance, thereby achieving cost reduction, compactification, and higher performance of the display device.

The projection optical system PL is configured to be obliquely non-telecentric on the display panel PA side, and is laid out so that rays of light are condensed from the display panel PA toward the incidence pupil of the projection optical system PL. For the non-telecentric optical system, a projection optical system is advantageously compact while an optical element having a condenser lens function in an illumination optical system is disadvantageously large. If, as is the case with like this projector, as an optical element having an optical power in the illumination optical system, the first and third mirrors M1 and M3 having concave reflection surfaces are used and also the second mirror M2 of a negative optical power having a convex reflection surface is arranged near the pupil of the illumination system (that is, near the third-order light source), each of rays of light with different image heights (that is, the position on the display surface (image surface) of the display panel PA) can enter the third mirror M3 functioning as a condenser lens with large angle difference. Therefore, rays of light can be efficiently widened with small space to thereby form an illumination optical system for the projection optical system PL which is non-telecentric on the display panel PA side.

In the case of this projector, between the exit-side end surface of the rod integrator RI and the pupil of the illumination system, the first mirror M1 having a relay lens function is arranged, and the optical power of the first mirror M1 is set so that the incidence-side end surface of the rod integrator RI and the pupil of the illumination system conjugate for each other. Moreover, the third mirror M3 having a condenser lens function is arranged between the pupil of the illumination system and the display panel PA, and the optical power of the third mirror M3 is set so that, together with part of the projection optical system PL located to the display panel PA side than the pupil of the projection system, the pupil of the illumination system and the pupil of the projection system conjugate for each other. Also, the first mirror M1 having a relay lens function and the third mirror M3 having a condenser lens function are set so that the exit-side end surface of the rod integrator RI and the display surface of the display panel PA conjugate for each other. With this configuration, light exiting from the exit-side end surface of the rod integrator RI can be efficiently directed to the small-size display panel PA, and light reflected from the display surface thereof can be efficiently directed to the projection optical system PL. Therefore, in the illumination optical system, reduction in the intensity of illumination can be suppressed while maintaining high optical performance, and also cost reduction and downsizing of the display device can be achieved.

Moreover, between the first and third mirrors M1 and M3 having concave reflection surfaces, the second mirror M2 having a convex reflection surface bends the optical path so that the optical axis of the rod integrator RI and the optical axis of the projection optical system PL become substantially parallel to each other, and bends the optical path so that the optical axis direction of the rod integrator RI and the normal direction of the display surface of the display panel PA substantially agree with each other. In this manner, it is preferable that there be a convex reflection surface between two concave reflection surfaces so that the optical axis of the rod integrator RI and the optical axis of the projection optical system PL become substantially parallel to each other, or so that the optical axis direction of the rod integrator RI and the normal direction of the display surface of the display panel PA substantially agree with each other. Bending the optical path between the first and third mirrors M1 and M3 permits making compact the optical configuration of the entire display device, and further permits reduction in error caused by shared use of a designed reference axis, simplifying position adjustment, ensuring the degree of freedom in layout, and the like. Moreover, it is preferable to provide the first and third mirrors M1 and M3 as one component to thereby integrate two concave reflection surfaces into one component, which permits reducing the number of components, reducing error, and achieving accuracy improvement.

The concave reflection surfaces provided in the first and third mirrors M1 and M3 and the convex reflection surface provided in the second mirror M2 each form a free curved surface. When an illumination optical system is formed with only an optical power of a reflection surface as in this embodiment, if at least one surface is formed into a free curved surface, the illumination efficiency improves accordingly. For example, when a digital micromirror device is used as the display panel PA, oblique illumination on the display surface is necessary, but the use of a free-curved surface permits satisfactorily correcting aberration such as distortion and the like even upon the oblique illumination. This therefore permits light to be efficiently directed toward the incidence pupil of the projection optical system PL to thereby brighten the display. More specifically, focusing performance (for example, blur or distortion) on the display panel PA which conjugate for the exit-side end surface of the rod integrator RI can be improved, so that light reflected on the display panel PA can be efficiently collected at the incidence pupil of the projection optical system PL to thereby improve the illumination efficiency. Moreover, illuminance change attributable to the position on the screen can be reduced, thereby permitting reduction in brightness ununiformity.

In this projector, the concave reflection surfaces of the first and third mirrors M1 and M3 are formed into free-curved surfaces since forming the concave reflection surface located closest to the display panel PA and the concave reflection surface located closest to the exit-side end surface of the rod integrator RI into free curved surfaces is effective in achieving an improvement in the illumination efficiency and reduction in brightness ununiformity described above. When a digital micromirror device is used as the display panel PA, forming the concave reflection surface located closest to the display panel PA into a free curved surface permits illumination light reflected on the micromirror in an ON state to be efficiently directed to the pupil of the projection system, thus permitting effectively achieving an improvement in the illumination efficiency and reducing in the brightness ununiformity. Moreover, forming the concave reflection surface located closest to the exit-side end surface of the rod integrator RI into a free-curved surface permits favorably correcting aberration upon focusing the exit-side end surface on the display panel PA. This permits more effectively achieving an improvement in the illumination efficiency by means of reduction in distortion and blur.

In addition, if the vertical direction of the display surface of the display panel PA is provided as a y-axis direction and the horizontal direction thereof is provided as a z-axis direction, the concave reflection surfaces of the first and third mirrors M1 and M3 each has a shape of a free curved surface asymmetrical in the y-axis direction and the z-axis direction. In this manner, it is preferable that at least one of the concave reflection surfaces forming a reflection optical system have a shape of a free-curved surface asymmetrical in the y-axis direction and the z-axis direction. This results in easy control of reflection direction of a ray of light depending on the position of the concave reflection surface struck, which permits an improvement in the optical performance in focusing and distortion. In the case of this projector, as can be seen in FIG. 12, the object surface (exit-side end surface of the rod integrator RI) and the image surface (display surface of the display panel PA) are large mainly in the z-axis direction, the free curved surface of each concave reflection surface is also optimized into a shape in which this layout is reflected.

Further, for the radius of curvature at a point at which a ray of light passing from the center of the exit-side end surface of the rod integrator RI through the display panel PA and reaching the center of the incidence pupil of the projection optical system PL strikes the concave reflection surface formed into a free curved shape, it is preferable that the concave reflection surface having a free curved shape satisfy condition: |Radius of curvature as measured in the plane which is perpendicular to the plane including both the ray incident on the concave reflection surface having a free curved shape and the ray exiting therefrom and also which includes a normal vector to this concave reflection surface|<|Radius of curvature as measured in the plane including both the ray incident on the concave reflection surface having a free curved shape and the ray exiting therefrom|, and also it is preferable that this free-curved shape is not plane-symmetric. This configuration permits improving the optical performance, reducing distortion, and improving the focusing performance, which in turn permits improving the illumination efficiency.

As a substrate material forming the reflection surfaces of the mirrors M1 to M3, any of glass, plastic, metal, ceramic, or the like may be used depending on needs. For example, a material, such as glass or the like, whose shape is less deformable, is preferable to prevent deterioration in the focusing performance caused by temperature change, while a plastic material, such as PMMA (polymethylmethacrylate), PC (polycarbonate), or the like, is preferable to reduce the costs. To improve the illumination efficiency, it is required to provide the substrate with a coating having a high reflectance, more specifically, a metal reflective thin-film of Al (aluminum), Ag (silver), or the like may be formed or an reflection enhancing film may be formed which is coated with a dielectric substance. In addition, a multilayer may be coated which is formed of a dielectric substance of several tens of layers. In this case, unlike the metal film, no optical absorption by metal occurs, thus causing no problem that absorbed light transforms into heat during in use, which is preferable. Moreover, the reflectance for visible light on a reflection surface is preferably approximately 90% or more.

Figure 13:
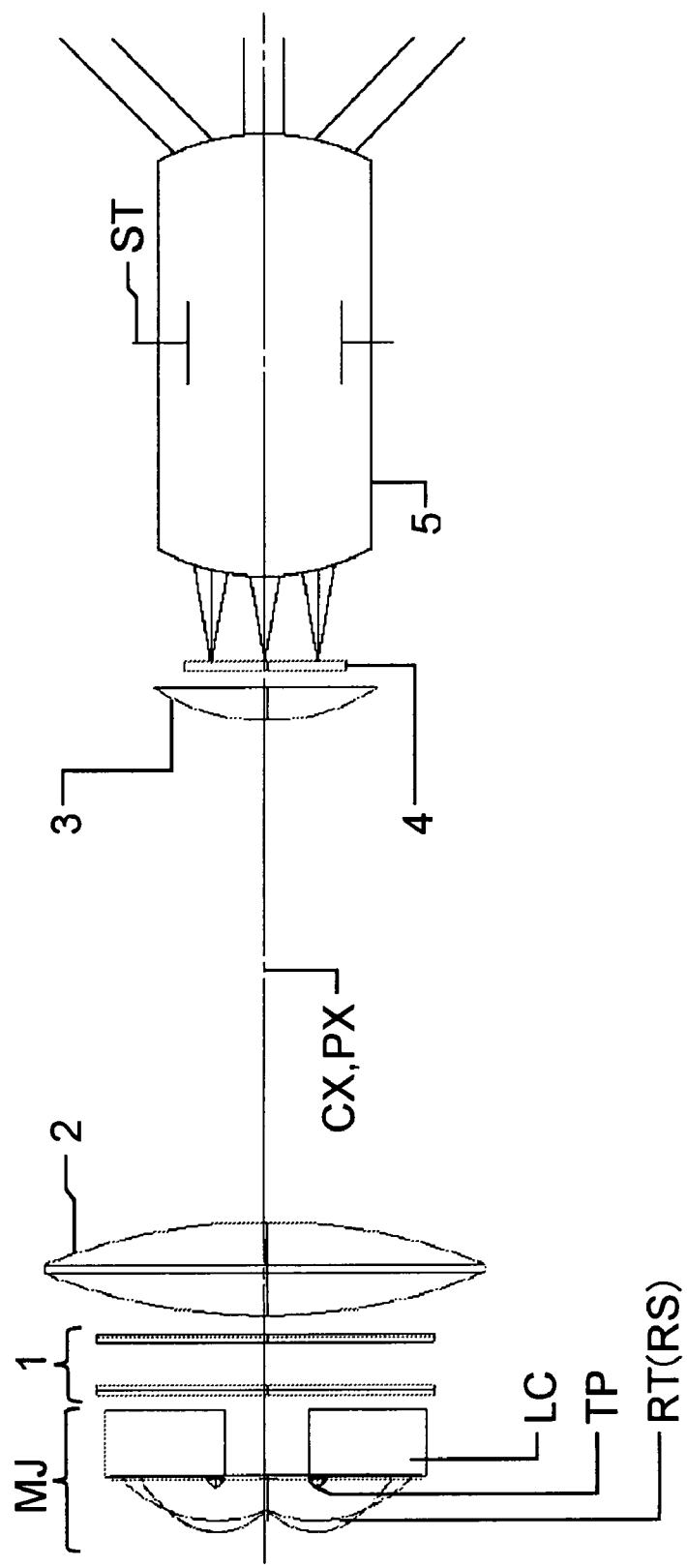
FIG. 13 is an optical configuration diagram schematically showing one embodiment of an image projection apparatus according to the invention.

FIG. 13 shows one embodiment of a projector (image projection apparatus) provided with one light-emitting module as a light source device. The configuration of this projector will be described below. In FIG. 13, MJ denotes a light-emitting module, 1 denotes a pair of lens arrays, 2 denotes a condenser lens, 3 denotes a field lens, 4 denotes a transmission type liquid crystal element (LCD: liquid crystal display), 5 denotes a projection optical system, and ST denotes an aperture stop. The light-emitting module MJ is provided with a reflector RT having four concave reflection surfaces RS and four LED chips TP. The four LED chips TP are provided in a combination including those emitting light of colors corresponding to at least three primary colors RGB (for example, a combination of RGBY or RGGB). Configuring at least three LED chips corresponding to RGB permits small-size full color display at low price without use of a dichroic prism or a dichroic mirror. For monochrome display, only monochromatic illumination is required; thus, LED chips of the same color may be used, and a reflector having only one concave reflection surface may be used.

The lens array 1, the condenser lens 2, and the field lens 3 are main elements forming an illumination optical system, and light emitted from the light-emitting module MJ is directed to the transmission type liquid crystal element 4 by this illumination optical system, upon which illumination light exiting from each cell of the lens array 1 is superimposed on the transmission type liquid crystal element 4 by the condenser lens 2 whereby the spatial energy distribution is uniformed to thereby uniformly illuminate the transmission type liquid crystal element 4. The transmission type liquid crystal element 4 is so configured as to be driven in a time-shared manner, and is subjected to illumination from the light-emitting module MJ at turn-on timing in synchronization with an image signal (for example, in order of RGB or RGBY). The image formed by the transmission type liquid crystal element 4 illuminated by the illumination optical system is projected on a screen (not shown) by the projection optical system 5.

In the projector shown in FIG. 13, the transmission type liquid crystal element 4 is so configured as to be driven in a time shared manner. Thus, a high-definition image can be provided with compact configuration by effectively using the entire region of the liquid crystal element surface for spatial modulation although in a single-plate type. Methods of displaying an image by using a spatial modulation element include a three-plate method, a single-plate color filter method, a single-plate time-sharing method, and the like. For the three-plate method, three spatial modulation elements are required, which leads to cost increase and upsizing. For the single-plate color filter method, the pixel size is ⅓, which results in darkness, and increasing the pixel to provide brightness results in overall upsizing. For the single-plate time sharing method in which the spatial modulation element is driven in a time-shared manner, the entire spatial modulation element region can be effectively used, which is preferable in achieving higher image quality, downsizing, and cost reduction. Moreover, configuration that at least one of a plurality of LED chips radiates light in a different wavelength range permits multicolor display. Thus, adopting the single-plate time sharing method as a coloring method no longer requires a dichroic prism and a dichroic mirror for color synthesis. Requiring no optical member for color synthesis permits reducing the interval between the light-emitting module and the transmission type spatial modulation element, which permits downsizing of the image projection apparatus.

The spatial modulation element driven in the single-plate time sharing method is of a reflection type or a transmission type. Examples of the spatial modulation element of the reflection type include: a digital micromirror device and a reflection type liquid crystal element. Use of the digital micromirror device requires a large space for separating incident light from reflected light, while use of the reflection type liquid crystal element requires insertion of a polarization beam splitter (PBS). Therefore, the use of the spatial modulation element of the reflection type requires a fixed space between the spatial modulation element and the projection optical system, which inevitably leads to upsizing of the projection optical system with a large lens back. On the contrary, use of the spatial modulation element of the transmission type like the transmission type liquid crystal element 4 permits arrangement of the projection optical system immediately behind the spatial modulation element, thus permitting downsizing of the projection optical system and also permitting downsizing of the entire image projection apparatus.

As described later in detail, a combination of a light-emitting module having structure of a so-called reflection type LED and a spatial modulation element of a transmission type permits downsizing of the image projection apparatus and also permits providing a bright projection image. With this combination, for example, the light-emitting module MJ shown in FIG. 13 is downsized and the light-emitting module MJ is arranged with the front surface thereof spatially close to the transmission type liquid crystal element 4 (the incidence-side polarizing plate in particular), thereby permitting downsizing of the image projection apparatus.

It is preferable that a transmission type liquid crystal element with a sapphire substrate be provided as a spatial modulation element of a transmission type. An electrode constructed on sapphire has generally higher electrical conductivity than that of an electrode constructed on glass. Thus, a liquid crystal element with an electrode arranged on sapphire can have thinner wiring than that of a liquid crystal element with an electrode arranged on glass. As a result, the aperture ratio of the transmission type liquid crystal element can be increased, thereby permitting bright display. Here, as the spatial modulation element of the transmission type, the transmission type liquid crystal element 4 is illustrated, although not limited thereto. Instead of the transmission type liquid crystal element 4, a spatial modulation element of a different transmission type may be used which spatially modulates illumination light to thereby form an image.

In the light-emitting module MJ shown in FIG. 13, as described in FIGS. 4 to 9, an LED is prepared as a light emitter. The LED has advantages of small size, low price, and low power consumption. The LED also has an advantage that it does not require replacement since, unlike an electric bulb, it does not burn out, an advantage that it can be activated quickly without requiring much time before start of light emission like a discharge lamp, and the like. Thus, the LED can be said to be a light emitter preferable for a light source device of a portable, small-size image projection apparatus. Moreover, since the reflector RT with the features described above is used in the light-emitting module MJ, a bright projection image can be provided by achieving higher luminance and higher efficiency even with a small-size image projection apparatus. The LED is usually featured to have a large angle of divergence, and thus when used as a light source of a projector, performs inefficiently unless the angle of divergence is optimized (unless condensation is performed). Generally, a lens is used for condensing light from the LED, although it is difficult to taken in all light with the lens. On the contrary, a reflection type LED has a folded portion and thus has favorable space efficiency which makes it difficult to be upsized, and also can take in all light emitted hemispherically and thus is high in utilization efficiency.

As described above, the LED chip requires heat radiation. An electrode lead where the LED chip is fixed also serves as a heat sink and thus can quickly cool down the LED chip, thus permitting preventing an increase in the temperature of the LED chip to thereby achieve higher intensity. Generally, optical power (brightness) proportional to the amount of current can be provided until the junction temperature can be kept fixed, but when the junction temperature becomes high, additional making current turns into heat. Effective heat radiation permits a large current which can keep the junction temperature fixed, thus providing brightness proportional to the making current. Therefore, higher intensity of the light-emitting module permits achieving a small-size, low-cost image projection apparatus which provides a bright projection image.

When the number of colors of light emitted by the LED are at least three including RGB, for example, the light-emitting modules MJ shown in FIGS. 4 and 5 have the reflector RT so structured as to have four concave reflection surfaces RS, and thus the four LED chips TP may be provided in a combination of RGBY or a combination of RGGB. Moreover, upon full-color display by turning on the LEDs in order such as RGB, RGBY, or the like, appropriately setting the turn-on timing can improve the overall luminance. More specifically, with the turn-on timing (1 frame: for example, 1/30 seconds) shown in FIGS. 10A to 10D, for example, by using one light-emitting module MJ with a combination of RGBY or RGGB, RGB may be simply divided into three as shown in FIG. 10A, or the time for G may be increased as shown in FIG. 10B, or a time zone may be provided at which two or more of them are turned on simultaneously as shown in FIG. 10C, or time may be provided at which Y and G overlap with each other as shown in FIG. 10D.

As can be seen from FIG. 13, the projection optical system 5 is telecentric to the transmission type liquid crystal element 4 side, and the screen center of the transmission type liquid crystal element 4 and the optical axis PX of the projection optical system 5 agree with each other (the both center axes CX agree with each other). When color angle synthesis is performed as is the case with this image projection apparatus, there is a concern that color ununiformity on the projection screen may arise. However, as described above, providing configuration that the projection optical system is telecentric to the spatial modulation element side, or configuration that the screen center of the spatial modulation element and the optical axis of the projection optical system agree with each other permits preventing color ununiformity from arising on the projection screen due to the color angle synthesis. Therefore, the configuration that the projection optical system is telecentric to the spatial modulation element side, or the configuration that the screen center of the spatial modulation element and the optical axis of the projection optical system agree with each other are preferable. Moreover, it is further preferable to simultaneously satisfy both the configuration that the projection optical system is telecentric to the spatial modulation element side and the configuration that the screen center of the spatial modulation element and the optical axis of the projection optical system agree with each other.

Figure 14A:
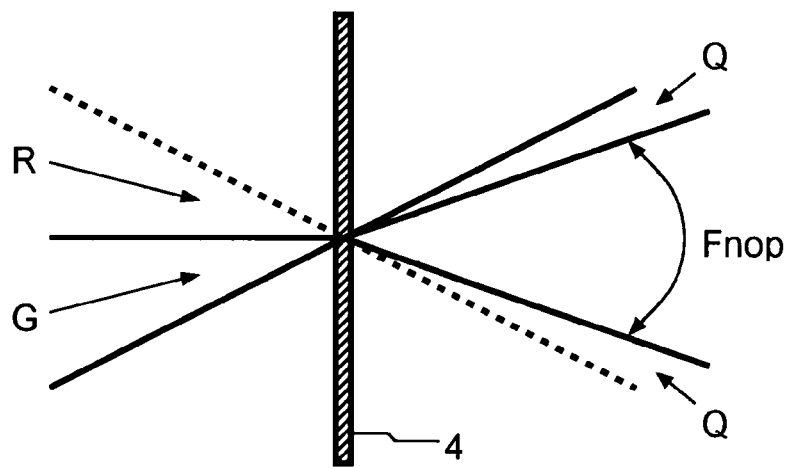
FIGS. 14A and 14B are diagrams for explaining telecentricity of a projection optical system according to the invention.
Figure 14B:
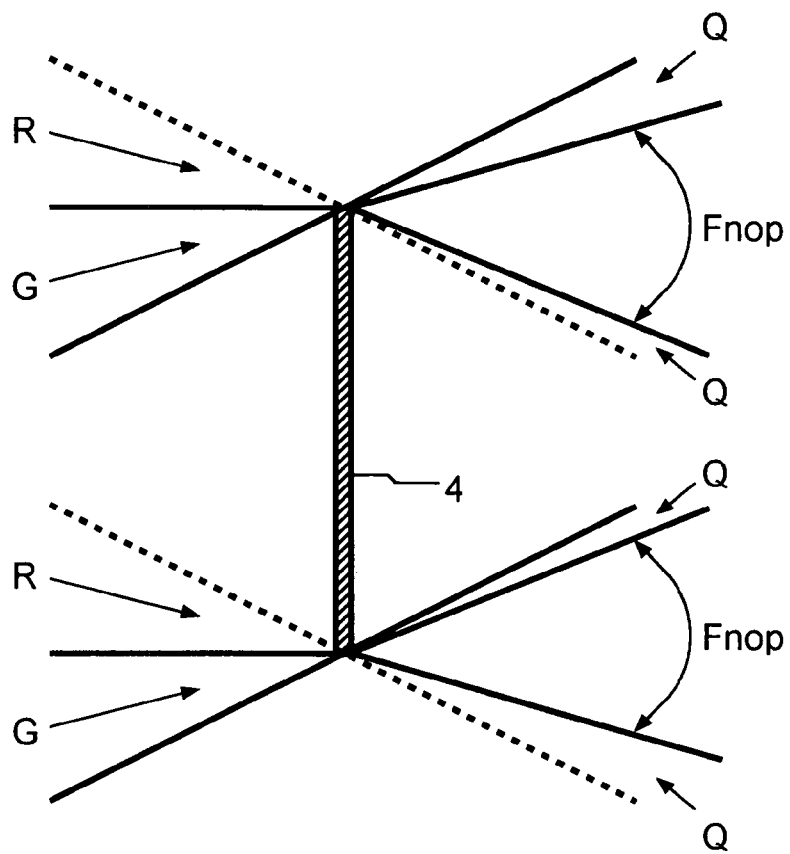

For example, as shown in FIG. 14A, when light of R and G illuminate the transmission type liquid crystal element 4, light which does not fall within the F number (Fnop) of the projection optical system of the projection system 5 is eclipsed (Q: eclipsed portion). When the projection optical system 5 is telecentric to the transmission type liquid crystal element 4 side, the amount of eclipse are the same for on-axis and off-axis. However, when the projection optical system 5 is not telecentric to the transmission type liquid crystal element 4 side, as shown in FIG. 14B, the amount of eclipse is different, thus causing color ununiformity for off-axis. Therefore, this appearance of color ununiformity can be resolved by configuring the projection optical system to be telecentric to the spatial modulation element side. The same applies to the illumination optical system, and it is preferable that the illumination optical system be configured to be telecentric to the spatial modulation element side.

As described above, a combination of the light-emitting module having structure of a reflection type LED and the spatial modulation element of a transmission type permits downsizing of the image projection apparatus and also providing a bright projection image. This combination permits, for example, the front face of the light-emitting module MJ and the transmission type liquid crystal element 4 (the incidence-side polarizing plate in particular) shown in FIG. 13 to be arranged spatially close to each other. The transmission type liquid crystal element 4 has the incidence-side polarizing plate which absorbs specific polarized light to be thereby high in temperature, and thus needs to be cooled down. Locating the light-emitting module MJ and the transmission type liquid crystal element 4 close to each other permits common use of a cooling structure. The common use of the cooling structure permits further downsizing of the image projection apparatus.

Figure 15:
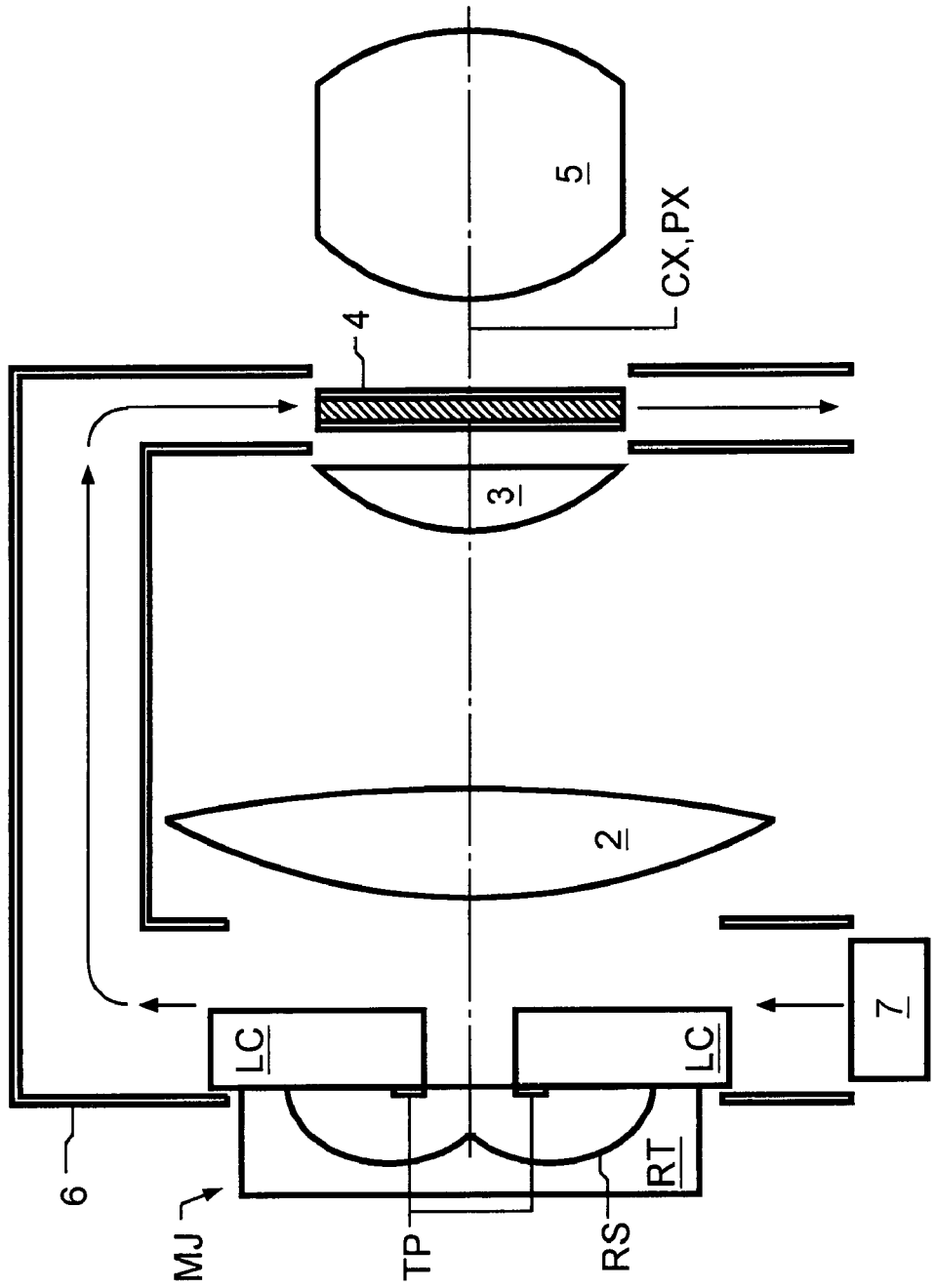
FIG. 15 is a diagram schematically showing one embodiment of an image projection apparatus having a cooling structure according to the invention.

FIG. 15 shows one embodiment of an image projection apparatus having a cooling structure. This image projection apparatus has a duct 6 and a cooling system (for example, blower) 7 added to the image projection apparatus shown in FIG. 13 (lens array 1 is omitted from the illustration). From the cooling system 7, air is delivered as a refrigerant into the duct 6. The flow of wind thereof is indicated by arrows in the duct 6. The wind exiting from the cooling system 7 makes contact with the electrode lead LC of the light-emitting module MJ to cool down the LED chip TP, and cools down the transmission type liquid crystal element 4, and is exhausted from the duct 6. In this manner, providing the configuration that the spatial modulation element and the light-emitting module are cooled by the same cooling system permits providing high radiation effect while downsizing the image projection apparatus as a whole. Then, for the light-emitting module, the radiation effect of the electrode lead improves, thus permitting achieving even higher intensity.

Figure 16:
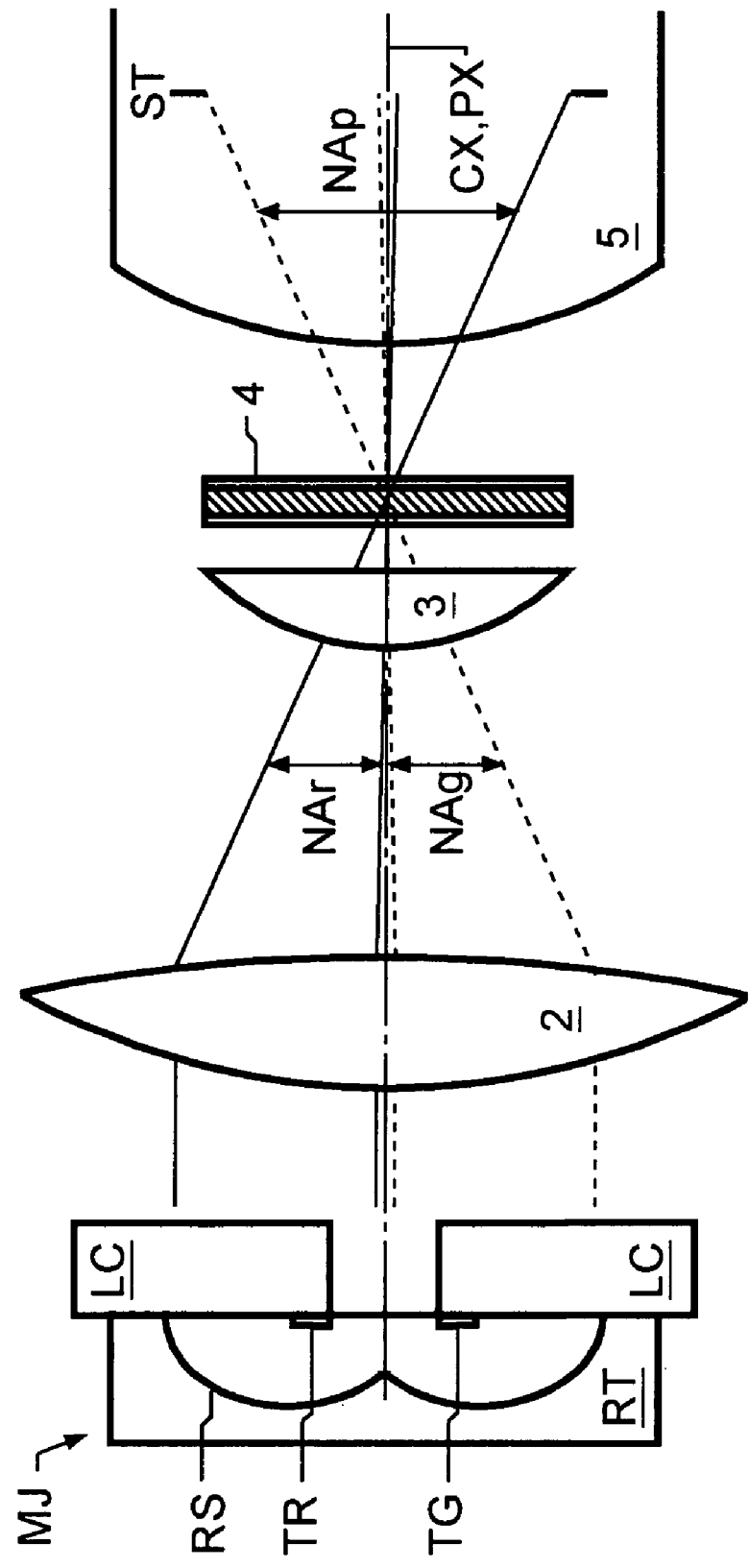
FIG. 16 is an optical configuration diagram for explaining the NA relationship in the image projection apparatus provided with a light-emitting module.

As described above, providing the configuration that the light-emitting module has at least three LED chips corresponding to RGB permits achieving a low-price, small-size full color display without use of a dichroic prism or a dichroic mirror. With such configuration, it is preferable that the NA (numerical aperture) of the projection optical system be larger than the NA of each color. For example, assume a case, as shown in FIG. 16, where light of R from the LED chip TR and light of G from the LED chip TG are respectively reflected on the concave reflection surfaces RS, exit from the reflector RT substantially in parallel thereto, condensed by the condenser lens 2, pass through the field lens 3, and illuminate the transmission type liquid crystal element 4. Then, assume that the NA of light from the LED chip TR for R light emission (indicated by a solid line) is NAr, the NA of light from the LED chip TG for G light emission (indicated by a broken line) is NAg, and the NA of the projection optical system 5 is NAp, it is preferable that the NAp of the projection optical system 5 be larger than the NAr and NAg of the respective colors of light entering from the light-emitting module MJ to the projection optical system 5.

With configuration that the light-emitting module has at least three LED chips corresponding to RGB, light of the respective colors enter the spatial modulation element at different angles of incidence. Thus, unless the NA of the projection optical system is set larger than that of each color, light from the light source cannot effectively reach the screen through the projection optical system. Thus, the effective diameter of the projection optical system (that is, NA) needs to be set so that all light of R, G, and B enter the projection optical system. Setting the NA of the projection optical system larger than the NA of each color of light entering the projection system permits light exiting from the light-emitting module to efficiently enter the projection optical system without use of a prism or a mirror for color synthesis. Moreover, as shown in FIG. 16, when there are two light-emitting points sandwiching the optical axis PX of the projection optical system 5, it is further preferable that the NA of the projection optical system be set double the NA of each color of light entering from the light-emitting module to the projection optical system.

Generally, light emitted from the LED is not polarized, so that a liquid crystal element using polarization requires a polarizing plate before and after incidence on the liquid crystal element. As the polarizing plate, an absorption type and a reflection type are known. The use of an absorption type polarizing plate as the incidence-side polarizing plate of the liquid crystal element results in absorption of particular polarization by the incidence-side polarizing plate, which in turn leads to an increase in the temperature of the incidence-side polarizing plate. To avoid this, for example, in the projector shown in FIG. 13, a polarization conversion element may be used which is composed of a polarization beam splitter array and a half-wave plate between the lens array 1 and the condenser lens 2. The use of the reflection type polarizing plate can avoid the temperature increase and also can increase the light utilization efficiency in order that loss of illumination light does not occur on the incidence-side polarizing plate. To avoid the loss of illumination light on the incidence-side polarizing plate, optical configuration may be provided such that light reflected on the reflection type polarizing plate is reused. For example, the reflection type polarizing plate may be arranged between the light-emitting module and a liquid crystal layer for spatial modulation, and a quarter-wave plate may be arranged between the light-emitting module and the reflection type polarizing plate. This permits reuse of light reflected on the reflection type polarizing plate by way of polarization conversion on the quarter-wave plate. Hereinafter, more detailed description will be given, referring to detailed configuration examples (FIGS. 17 and 18).

Figure 17:
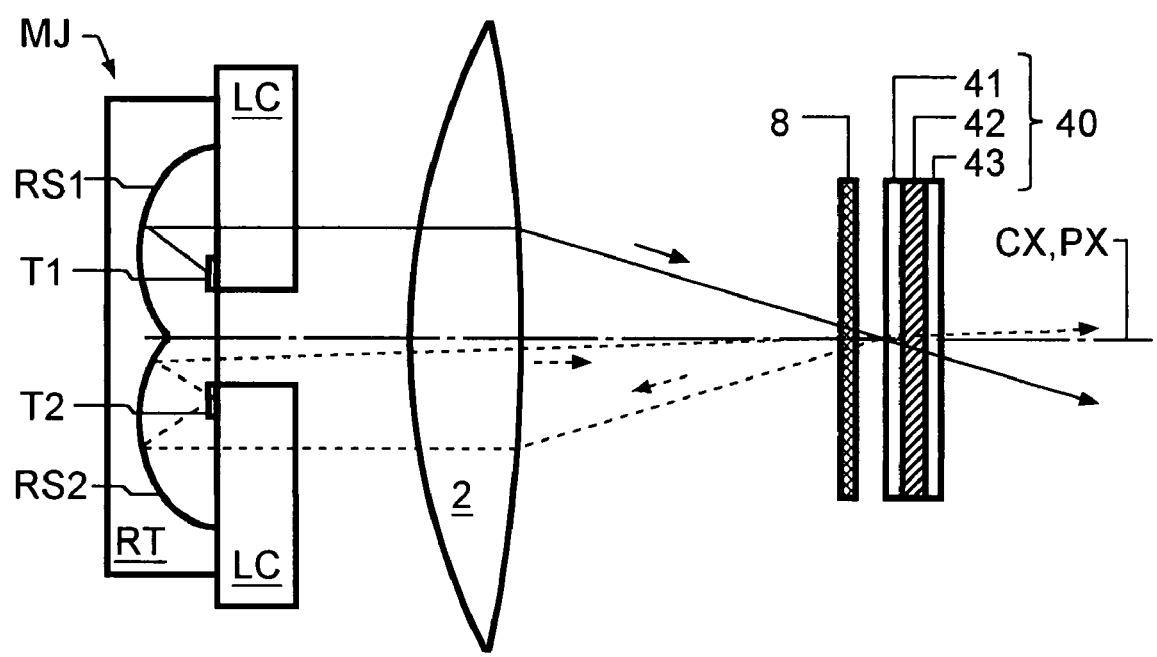
FIG. 17 is an optical configuration diagram showing a first configuration example using a reflection type polarizing plate according to the invention.
Figure 18:
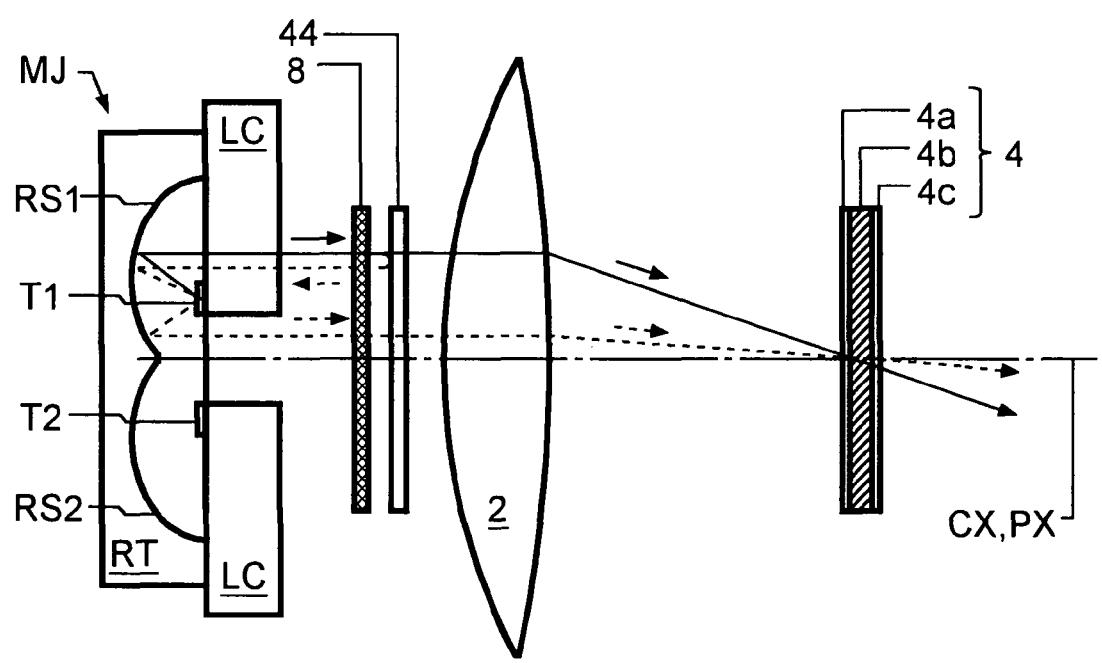
FIG. 18 is an optical configuration diagram showing a second configuration example using the reflection type polarizing plate.

FIG. 17 shows the first configuration example using the reflection type polarizing plate. A transmission type liquid crystal element 40 is composed of: in order from the light incidence side, an incidence-side polarizing plate 41, a liquid crystal layer 42, and an exit-side polarizing plate 43, and a reflection type polarizing plate is used as the incidence-side polarizing plate 41 and an absorption type polarizing plate is used as the exit-side polarizing plate 43. The reflection type polarizing plate transmits particular linearly polarized light and also reflects linearly polarized light with an oscillation surface (that is, polarization direction) perpendicular to the aforementioned linearly polarized light. Detailed examples of such a reflective type polarizing plate include: for example, a DBEF (product name) manufactured by Sumitomo 3M Corporation and a wire grid. Moreover, on the light incidence side of the transmission type liquid crystal element 40, a quarter-wave plate 8 is inserted which is tilted through 45 degrees with respect to the transmission axis of the incidence-side polarizing plate 41.

Light exiting from the LED chip T1 of the light-emitting module MJ (indicated by a solid line) is reflected on the concave reflection surface RS1, is transmitted through the condenser lens 2 and quarter-wave plate 8 in this order, and then enters the transmission type liquid crystal element 40. Linearly polarized light in a particular polarization direction is transmitted through the incidence-side polarizing plate 41, while linearly polarized light in a polarization direction orthogonal to the aforementioned polarization direction is reflected on the incidence-side polarizing plate 41. The light transmitted through the incidence-side polarizing plate 41 (indicated by a solid line) enters the liquid crystal layer 42, and enters the exit-side polarizing plate 43 after its polarization condition is spatially modulated by application of a voltage corresponding to a video signal. The exit-side polarizing plate 43 forms an image by replacing a difference in the polarization condition of light modulated at the liquid crystal layer 42 with a difference in the light intensity.

The light reflected on the incidence-side polarizing plate 41 (indicated by a broken line) is transmitted through the quarter-wave plate 8 and the condenser lens 2 in this order, then reflected on the concave reflection surface RS2 (adjacent to the concave reflection surface RS1), and then reaches the LED chip T2. Since the LED chip T2 is an optical transparent body, after transmitted through the LED chip T2, light is reflected on the electrode lead LC, transmitted again through the LED chip T2, and then reflected on the concave reflection surface RS2. It is preferable that the surface of the electrode lead LC where the LED chip T2 is fixed be provided with a mirror or a reflection coat (for example, a reflection coat with high reflection factor formed of a metal material, such as aluminum, silver, or the like). Providing such surface treatment permits light reflected from the concave reflection surface RS2 and entering the electrode lead LC again to be reflected again toward the concave reflection surface RS2, and also permits an improvement in the function of the electrode lead LC as a heat sink.

Light reflected on the concave reflection surface RS2 is transmitted through the condenser lens 2 and the quarter-wave plate 8 in this order, and enters the transmission type liquid crystal element 40 again, upon which the light entering the transmission type liquid crystal element 40 again is transmitted through the quarter-wave plate 8 twice through reciprocation after reflected on the incidence-side polarizing plate 41. As a result, since the polarization direction is rotated through 90 degrees from the condition in which the light is reflected by the incidence-side polarizing plate 41 (that is, the light polarized in the direction orthogonal to the polarization direction upon reflection), the light can be transmitted through the incidence-side polarizing plate 41. The light transmitted through the incidence-side polarizing plate 41 (indicated by broken lines) enters the liquid crystal layer 42, and after its polarized state is spatially modulated through application of a voltage corresponding to a video signal, enters the exit-side polarizing plate 43. The exit-side polarizing plate 43 forms an image by replacing a difference in polarization condition of light modulated at the liquid crystal layer 42 with a difference in the light intensity.

As described above, the use of the reflection type polarizing plate as the incidence-side polarizing plate of the transmission type liquid crystal element returns a polarization component not required for liquid crystal display to the light-emitting module side. The light-emitting module has a structure of a reflection type LED, and thus the returning light is directed again toward the transmission type liquid crystal element. Arrangement of the quarter-wave plate at a position between the light-emitting module and the incidence-side polarizing plate of the transmission type liquid crystal element so that the polarization direction is rotated through 90 degrees by this reciprocation permits the returning light to be reused as a polarization component required for liquid crystal display. Therefore, no loss of illumination light occurs, resulting in an improvement in the light utilization efficiency. Moreover, the use of the reflection type polarizing plate as the incidence-side polarizing plate permits preventing temperature increase, on this plate, caused by absorption of illumination light.

FIG. 18 shows the second configuration example of using the reflection type polarizing plate. The transmission type liquid crystal element 4 is formed of: in order from the light incidence side, an incidence-side polarizing plate 4a, a liquid crystal layer 4b, and an exit-side polarizing plate 4c. As the incidence-side polarizing plate 4a and the exit-side polarizing plate 4c, absorption type polarizing plates are used. Between a light-emitting module MJ and a condenser lens 2, a quarter-wave plate 8 and a reflection type polarizing plate 44 are arranged in order from the light-emitting module MJ side, and the quarter-wave 8 is arranged in such a manner as to be tilted at 45 degrees with respect to the transmission axis of the reflection type polarizing plate 44. The reflection type polarizing plate 44, as is the case with the incidence-side polarizing plate 41 (FIG. 17), transmits particular linearly polarized light and also reflects linearly polarized light with an oscillation surface (that is, polarization direction) perpendicular to the aforementioned linearly polarized light, detailed examples of which are represented by, for example, DBEF (product name) manufactured by Sumitomo 3M Corporation and a wire grid.

Light exiting from an LED chip T1 of the light-emitting module MJ (indicated by a solid line) is reflected on a concave reflection surface RS1, is transmitted through a quarter-wave plate 8, and then enters the reflection type polarizing plate 44. Linearly polarized light in a particular polarization direction is transmitted through the reflection type polarizing plate 44, while linearly polarized light in a polarization direction orthogonal to the aforementioned polarization direction is reflected on the reflection type polarizing plate 44. The light transmitted through the reflection type polarizing plate 44 (indicated by a solid line) transmitted through the condenser lens 2 and then enters the transmission type liquid crystal element 4. The incidence-side polarizing plate 4a is so configured as to transmit light transmitted through the reflection type polarizing plate 44, so that no absorption of illumination light on the incidence-side polarizing plate 4a occurs. The light transmitted through the incidence-side polarizing plate 4a enters a liquid crystal layer 4b, and then enters an exit-side polarizing plate 4c after its polarization condition is spatially modulated by application of a voltage corresponding to a video signal. The exit-side polarizing plate 4c forms an image by replacing a difference in the polarization condition of light modulated at the liquid crystal layer 4b with a difference in the light intensity.

The light reflected on the reflection type polarizing plate 44 (indicated by a broken line) is transmitted through the quarter-wave plate 8, then reflected on the concave reflection surface RS1, and then reaches the LED chip T1. Since the LED chip T1 is an optical transparent body, after transmitted through the LED chip T1, the light is reflected on an electrode lead LC, transmitted again through the LED chip T1, and then reflected on the concave reflection surface RS1. It is preferable that the surface of the electrode lead LC where the LED chip T1 is fixed be provided with a mirror or a reflection coat (for example, a reflection coat with high reflection factor formed of a metal material, such as aluminum, silver, or the like). Providing such surface treatment permits light reflected from the concave reflection surface RS1 and entering the electrode lead LC again to be reflected again toward the concave reflection surface RS1, and also permits an improvement in the function of the electrode lead LC as a heat sink.

Light reflected on the concave reflection surface RS1 is transmitted through the quarter-wave plate 8, and enters the reflection type polarizing plate 44 again, upon which the light entering the reflection type polarizing plate 44 again is transmitted through the quarter-wave plate 8 twice through reciprocation after reflected on the reflection type polarizing plate 44. As a result, since the polarization direction is rotated through 90 degrees from the condition in which the light is reflected by the reflection type polarizing plate 44 (that is, the light polarized in the direction orthogonal to the polarization direction upon reflection), the light can be transmitted through the reflection type polarizing plate 44. The light transmitted through the reflection type polarizing plate 44 (indicated by a broken line) is transmitted through the condenser lens 2 and enters the transmission type liquid crystal element 4. The incidence-side polarizing plate 4a is so configured as to transmit light transmitted through the reflection type polarizing plate 44, causing no absorption of illumination light at the incidence-side polarizing plate 4a. The light transmitted through the incidence-side polarizing plate 4a enters the liquid crystal layer 4b, and after its polarized state is spatially modulated through application of a voltage corresponding to a video signal, enters the exit-side polarizing plate 4c. The exit-side polarizing plate 4c forms an image by replacing a difference in polarization condition of light modulated at the liquid crystal layer 4b with a difference in the light intensity.

As described above, the arrangement of the reflection type polarizing plate at some place between the transmission type liquid crystal element and the light-emitting module returns a polarization component not required for liquid crystal display to the light-emitting module side. The light-emitting module has a structure of a reflection type LED, and thus the returning light is directed again toward the transmission type liquid crystal element. Arrangement of the quarter-wave plate at a position between the light-emitting module and the reflection type polarizing plate so that the polarization direction is rotated through 90 degrees by this reciprocation permits the returning light to be reused as a polarization component required for liquid crystal display. Therefore, no loss of illumination light occurs, resulting in an improvement in the light utilization efficiency. Moreover, this arrangement also permits preventing temperature increase, on the incidence-side polarizing plate of the transmission type liquid crystal element, caused by absorption of illumination light. Polarization conditions of light entering the incidence-side polarizing plate of the transmission type liquid crystal element are basically all the same, thus permitting omission of the incidence-side polarizing plate.

As can be seen from the description above, the embodiments described above include configurations below.

A reflector with the first configuration is a single reflector having a plurality of concave reflection surfaces, and is characterized in that each of the concave reflection surfaces has an outer shape thereof partially notched at a boundary with the adjacent concave reflection surface.

A reflector with the second configuration is a single reflector having a plurality of concave reflection surfaces, and is characterized in that each of the concave reflection surfaces is so arranged as to be rotationally-symmetrical with respect to the center axis of the reflector and that when the reflector is viewed along the center axis from the front, a boundary between the adjacent concave reflection surfaces forms a straight line directed to the center axis.

A reflector with the third configuration is characterized in that, in the first or second configuration described above, the concave reflection surface is a rotationally-symmetrical surface having at least one focal point, the thickness of the concave reflection surface in the optical axis direction is substantially equal to the distance from the surface vertex of the concave reflection surface to the focal point thereof, and that, when the rotationally-symmetrical surface has two or more focal points, the thickness of the concave reflection surface in the optical axis direction is substantially equal to the distance from the surface vertex of the concave reflection surface to the focal point thereof which is located closer to the surface vertex.

A light-emitting module with the fourth configuration has: the reflector according to any one of the first to third configurations; and the same number of LEDs as that of the concave reflection surfaces, and is characterized in that the LED has an LED chip and an electrode lead for fixing the LED chip, that the LED chip is arranged at or near each focal position of the concave reflection surface, and that the electrode lead is arranged opposite to the concave reflection surface with respect to each LED chip.

A light-emitting module with the fifth configuration is characterized by, in the fourth configuration described above, having four concave reflection surfaces.

A light-emitting module with the sixth configuration is characterized in that, in the fourth or fifth configuration described above, the LED emits light of at least three colors including RGB.

A light-emitting module with the seventh configuration is characterized in that, in any one of the fourth to sixth configurations described above, the electrode lead is formed so that the size thereof in the direction parallel to the optical axis of the concave reflection surface is larger than the smallest size thereof on a plane perpendicular to the optical axis of the concave reflection surface.

A light-emitting module with the eighth configuration is characterized in that, in any one of the fourth to seventh configurations described above, the electrode leads in contact with the LED chip all face the same direction.

According to the first or second configuration, the single-structure of the reflector having a plurality of concave reflection surfaces permits overall downsizing while achieving higher intensity and higher efficiency and also requires no assembly operation. Further, the outer shape of the concave reflection surfaces are partially notched at a boundary between the adjacent concave reflection surfaces, or when the reflector is viewed along the center axis thereof from the front, the boundary between the adjacent concave reflection surfaces forms a straight line directed to the center axis; therefore, the reflector is small in the direction perpendicular to the center axis thereof, thus permitting further downsizing. Therefore, a small-size light-emitting module can be achieved with higher intensity and higher efficiency. Moreover, according to the second configuration, each concave reflection surface is so arranged as to be rotationally-symmetrical to the center axis of the reflector, thus permitting achieving a small-size light-emitting module with higher intensity and higher efficiency capable of uniform light emission and preventing ununiform illumination and the like in application to a typical rotationally-symmetrical optical system.

According to the third configuration, the concave reflection surface is a rotationally-symmetrical surface having at least one focal point, the thickness of the concave reflection surface in the optical axis direction thereof is substantially equal to the distance from the surface vertex of the concave reflection surface to the focal point thereof, and, when the rotationally-symmetrical surface has two or more focal points, the thickness of the concave reflection surface in the optical axis direction thereof is substantially equal to the distance from the surface vertex of the concave reflection surface to the focal point thereof located closer to this surface vertex. Thus, the reflector can be downsized in the directions perpendicular and parallel to the center axis thereof and also favorable light utilization efficiency and light distribution characteristics can be provided.

According to the fourth configuration, the LED chip is arranged at or near the focal position of each concave reflection surface and the electrode lead is arranged opposite to the concave reflection surface with respect to each LED chip; therefore, almost all of light from the LED chip is reflected on the concave reflection surface, thus, permitting achieving high light utilization efficiency. Moreover, the electrode lead functions as a heat sink, thus permitting preventing the temperature of the LED chip from becoming high to thereby achieve higher intensity.

According to the fifth configuration, the reflector is configured to have four concave reflection surfaces; therefore, the outer shape of the reflector (that is, the shape of the reflector when viewed along the center axis from the front) is close to a square. Therefore, upon horizontally or perpendicularly arranging a plurality of light-emitting modules so that they become parallel to one another, they can be arranged closely to one another without clearance therebetween. Moreover, according to the sixth configuration, the number of colors of light emitted by the LED is at least three including three primary colors RGB, thus permitting providing a light-emitting module capable of full-color emission.

According to the seventh configuration, the electrode lead is formed so that the size thereof in the direction parallel to the optical axis of the concave reflection surface is larger than the smallest size thereof on a plane perpendicular to the optical axis of the concave reflection surface. Thus, high radiating effect can be provided by the electrode lead while controlling at minimum the amount of reflected light shielded by the electrode lead. Moreover, according to the eighth configuration, the electrode leads in contact with the LED chip are all so configured as to face the same direction; therefore, a refrigerant (air, liquid, or the like) can be brought into contact with the electrode leads without interfering the flow of the refrigerant to thereby improve the heat radiating effect, thus achieving higher intensity.

An image projection apparatus with the ninth configuration is a small-size image projection apparatus provided with: a spatial modulation element of a transmission type which forms an image by spatially modulating illumination light; a light-emitting module having an LED for illuminating the spatial modulation element and a reflector; and a projection optical system which projects an image formed by the spatial modulation element. The image projection apparatus is characterized in that the LED has an LED chip and an electrode lead for fixing the LED chip, that a concave reflection surface which reflects light emitted from the LED chip is included in the reflector, that the LED chip is arranged at or near the focal position of the concave reflection surface, and that the electrode lead is arranged opposite to the concave reflection surface with respect to the LED chip.

The image projection apparatus with the tenth configuration is characterized in that: in the ninth configuration described above, the reflector is a single reflector having a plurality of concave reflection surfaces; as the LED chip, the same number of LED chips as that of the concave reflection surfaces are arranged; and the outer shape of each concave reflection surface is partially notched at a boundary with the adjacent concave reflection surface.

The image projection apparatus with the eleventh configuration is characterized in that: in the ninth or tenth configuration described above, the reflector is a single reflector having a plurality of concave reflection surfaces; as the LED chip, the same number of LED chips as that of the concave reflection surfaces are arranged, each concave reflection surface is so arranged as to be rotationally-symmetrical with respect to the center axis of the reflector; and when the reflector is viewed along the center axis thereof from the front, a boundary between the adjacent concave reflection surfaces forms a straight line directed to the center axis of the reflector.

The image projection apparatus with the twelfth configuration is characterized in that, in the tenth or eleventh configuration described above, at least one of a plurality of LED chips emits light in a different wavelength range from those of light emitted by the other LED chips.

The image projection apparatus with the thirteenth configuration is characterized in that, in the twelfth configuration described above, the spatial modulation element is driven in a time shared manner.

The image projection apparatus with the fourteenth configuration is characterized in that, in any one of the ninth to thirteenth configurations described above, the projection optical system is telecentric to the spatial modulation element side.

The image projection apparatus with the fifteenth configuration is characterized in that, in any one of the ninth to fourteenth configurations described above, the screen center of the spatial modulation element and the optical axis of the projection optical system agree with each other.

The image projection apparatus with the sixteenth configuration is characterized in that, in any one of the ninth to fifteenth configurations described above, the spatial modulation element and the light-emitting module are cooled down by the same cooling system.

The image projection apparatus with the seventeenth configuration is characterized in that, in any one of the tenth to sixteenth configurations, as the LED chip, at least three are provided which correspond to three primary colors RGB, and that the NA of the projection optical system is larger than the NA of each color of light entering the projection optical system from the light-emitting module.

According to the ninth configuration, the LED chip is arranged at or near the focal position of each concave reflection surface and the electrode lead is arranged opposite to the concave reflection surface with respect to the LED chip, so that almost all of light from the LED chip is reflected on the concave reflection surface, thus permitting achieving high light utilization efficiency. Moreover, the electrode lead for fixing the LED chip functions as a heat sink, thus permitting preventing the temperature of the LED chip from becoming high to thereby achieve higher intensity. Further, as a spatial modulation element which forms an image through spatial modulation of illumination light, a spatial modulation element of a transmission type is provided, which permits downsizing a projection optical system which projects an image formed by the spatial modulation element and also an entire image projection apparatus, thus achieving a small size, low-cost image projection apparatus with a bright projection image.

According to the tenth or eleventh configuration, the reflector is single-structured with a plurality of concave reflection surfaces, which permits overall downsizing while achieving higher intensity and higher efficiency and also requires no assembly operation. Further, the outer shape of each concave reflection surface is partially notched at a boundary with the adjacent concave reflection surfaces, or when the reflector is viewed along the center axis thereof from the front, the boundary between the adjacent concave reflection surfaces forms a straight line directed to the center axis of the reflector. Thus, the reflector is small in the direction perpendicular to the center axis thereof, thus permitting further downsizing. Moreover, according to the eleventh configuration, each concave reflection surface is so arranged as to be rotationally-symmetrical to the center axis of the reflector, thus permitting achieving a small-size light-emitting module with higher intensity and higher efficiency capable of uniform light emission and preventing ununiform illumination and the like in application to a typical rotationally-symmetrical optical system.

According to the twelfth configuration, at least one of a plurality of LED chips emits light in a different wavelength range from that of light emitted by the other LED chips, thus permitting multicolor display. Further, according to the thirteenth configuration, the spatial modulation element is driven in a time shared manner, thus permitting forming a high-resolution image with a compact configuration by effectively using the entire region of the spatial modulation element even with a single plate type. Moreover, due to driving in a time shared manner, LED emission is performed by pulse emission, so that the LED chip is cooled down during no LED is emitted. Therefore, high output can be provided upon emission, and thus a combination of the spatial modulation element driven in a time shared manner and the LED light source is suitable for higher luminance.

According to the fourteenth configuration, the projection optical system is telecentric to the spatial modulation element side, thus permitting the occurrence of color ununiformity on the projection screen caused by color angle synthesis to be suppressed.

According to the fifteenth configuration, the screen center of the spatial modulation element and the optical axis of the projection optical system agree with each other, thus permitting the occurrence of color ununiformity on the projection screen caused by color angle synthesis to be suppressed.

According to the sixteenth configuration, the spatial modulation element and the light-emitting module are cooled by the same cooling system, thus permitting providing high radiating effect while achieving downsizing of an entire image projection apparatus. For example, as a result of improvement in the radiating effect of the light-emitting module, even higher intensity can be achieved.

According to the seventeenth configuration, at least three LED chips corresponding to three primary colors RGB are provided, thus permitting providing full-color while achieving downsizing and cost reduction. Moreover, the NA of the projection optical system is larger than the NA of each color of light entering the projection optical system from the light-emitting module, thus permitting light exiting from the light-emitting module to be efficiently projected on the projection optical system even without the used of a prism or a mirror for color synthesis.

What is claimed is:

1. A light-emitting module comprising:
    a single reflector having a plurality of concave reflection surfaces each having an outer shape partially notched at a boundary thereof with the adjacent concave reflection surface; and
    light emitters in a same number as a number of the concave reflection surfaces, each of the light emitters adapted to emit light toward the concave reflection surface;
    the light emitters each including:
        a light-emitting diode chip arranged at or near a focal position of a respective one of the concave reflection surfaces, the light-emitting diode chip adapted to emit light toward the respective concave reflection surface; and
        an electrode lead, to which the light-emitting diode chip is fixed, the electrode lead being opposite the concave reflection surface with respect to the light-emitting diode chip, a size of the electrode lead in a direction parallel to an optical axis of the respective concave reflection surface being larger than a smallest size thereof on a plane perpendicular to the optical axis of the respective concave reflection surface, the electrode lead having a plate shape elongated in a direction perpendicular to the optical axis and extending away from the light-emitting diode chip, and the major surfaces of the electrode lead being exposed to air, wherein
    a ratio y/x is 2 to 6 where y is a width of each of the respective electrode leads as the size in the direction parallel to the optical axis of the corresponding concave reflection surface and x is a thickness as the smaller size on the plane perpendicular to the optical axis of the corresponding concave reflection surface.

2. The light-emitting module according to claim 1, wherein each of the concave reflection surfaces is a rotation-symmetrical surface having one focal point, and wherein a thickness of each of the concave reflection surfaces in an optical axis direction is substantially equal to a distance from a surface vertex of the respective concave reflection surface to the focal point thereof.

3. The light-emitting module according to claim 1, wherein the light-emitting module has four concave reflection surfaces.

4. The light-emitting module according to claim 1, wherein a number of colors of light emitted by the light-emitting module is at least three including red, blue, and green.

5. The light-emitting module according to claim 1, wherein each of the electrode leads in contact with the respective light-emitting diode chips all face a same direction.

6. A light-emitting module comprising:

a single reflector having a plurality of concave reflection surfaces arranged in rotational symmetry to a center axis of the reflector, wherein, when the reflector is viewed along the center axis thereof from front, a boundary between the adjacent concave reflection surfaces forms a straight line directed toward the center axis of the reflector; and light emitters in a same number as a number of the concave reflection surfaces, each of the light emitters adapted to emit light toward the concave reflection surface;

the light emitters each including:

a light-emitting diode chip arranged at or near a focal position of a respective one of the concave reflection surfaces, the light-emitting diode chip adapted to emit light toward the respective concave reflection surface; and an electrode lead, to which the light-emitting diode chip is fixed, the electrode lead being opposite the concave reflection surface with respect to the light-emitting diode chip, a size of the electrode lead in a direction parallel to an optical axis of the respective concave reflection surface being larger than a smallest size thereof on a plane perpendicular to the optical axis of the respective concave reflection surface, the electrode lead having a plate shape elongated in a direction perpendicular to the optical axis and extending away from the light-emitting diode chip, and the major surfaces of the electrode lead being exposed to air, wherein a ratio y/x is 2 to 6 where y is a width of each of the respective electrode leads as the size in the direction parallel to the optical axis of the corresponding concave reflection surface and x is a thickness as the smaller size on the plane perpendicular to the optical axis of the corresponding concave reflection surface.

7. The light-emitting module according to claim 6, wherein each of the concave reflection surfaces is a rotation-symmetrical surface having one focal point, and wherein a thickness of each of the concave reflection surfaces in an optical axis direction is substantially equal to a distance from a surface vertex of the respective concave reflection surface to the focal point thereof.

8. The light-emitting module according to claim 6, wherein the light-emitting module has four concave reflection surfaces.

9. The light-emitting module according to claim 6, wherein a number of colors of light emitted by the light-emitting module is at least three including red, blue, and green.

10. The light-emitting module according to claim 6, wherein each of the electrode leads in contact with the respective light-emitting diode chips all face a same direction.

* * * * *